United States Patent
Ikegami

(10) Patent No.: US 8,856,868 B2
(45) Date of Patent: Oct. 7, 2014

(54) IDENTIFICATION INFORMATION INTEGRATED MANAGEMENT SYSTEM, IDENTIFICATION INFORMATION INTEGRATED MANAGEMENT SERVER, AND COMPUTER READABLE RECORDING MEDIUM RECORDING IDENTIFICATION INFORMATION INTEGRATED MANAGEMENT PROGRAM THEREON

(75) Inventor: Jun Ikegami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 786 days.

(21) Appl. No.: 12/406,261

(22) Filed: Mar. 18, 2009

(65) Prior Publication Data
US 2010/0071041 A1    Mar. 18, 2010

(30) Foreign Application Priority Data
Jun. 13, 2008 (JP) .................. 2008-155063

(51) Int. Cl.
*G06F 21/00* (2013.01)
*G06F 21/32* (2013.01)
*G06F 21/31* (2013.01)

(52) U.S. Cl.
CPC ............... *G06F 21/32* (2013.01); *G06F 21/31* (2013.01)
USPC ...................... 726/2; 726/4; 726/26; 713/186

(58) Field of Classification Search
CPC ........................................... G06F 21/31–21/32
USPC ........................... 726/16–19, 27–28; 713/186
See application file for complete search history.

(56) References Cited

U.S. PATENT DOCUMENTS

| 6,256,737 | B1 * | 7/2001 | Bianco et al. ................. 713/186 |
| 6,765,470 | B2 | 7/2004 | Shinzaki |
| 2001/0017584 | A1 | 8/2001 | Shinzaki |
| 2007/0061590 | A1 * | 3/2007 | Boye et al. .................... 713/186 |

FOREIGN PATENT DOCUMENTS

| JP | 2001-236324 | 8/2001 |
| JP | 2001-307102 | 11/2001 |
| JP | 2004-38773 | 2/2004 |
| JP | 2004038773 A * | 2/2004 |
| JP | 2004-234329 | 8/2004 |

OTHER PUBLICATIONS

Dune, Chris. "Build and Implement a Single Sign on Solution." Sep. 30, 2003. Page 2.*
Notification of Reasons for Refusal mailed Nov. 13, 2012, from corresponding Japanese Application No. 2008-155063.

* cited by examiner

*Primary Examiner* — Fikremariam A Yalew
*Assistant Examiner* — Kendall Dolly
(74) *Attorney, Agent, or Firm* — Katten Muchin Rosenman LLP

(57) ABSTRACT

The present application relates to a technique applied to a system for performing authentication of a user by a one-to-one verification method by using an ID and biometric information of the user. When the user registers the ID and reference biometric information in a service providing system, the information is transmitted from the relevant service providing system to a management server. Then, in the management server, ID management by the reference biometric information is performed, and when the user inputs a wrong ID at the time of verification before the relevant service providing system starts to provide a service, a correct ID of the relevant user is found.

16 Claims, 17 Drawing Sheets

301a: MANAGEMENT TABLE

| MANAGEMENT NO. | REFERENCE BIOMETRIC DATA FIELD | ID MANAGEMENT FIELD (1) | ID MANAGEMENT FIELD (2) | ID MANAGEMENT FIELD (3) | ID MANAGEMENT FIELD (4) | ID MANAGEMENT FIELD (5) | ... |
|---|---|---|---|---|---|---|---|
| 000001 | BIOMETRIC DATA | ikegami01 | j_ikegami | 980116 | 00980116 | ikegami | |
| 000002 | BIOMETRIC DATA | marine | Leo | Josephine | mamekuro | | |
| 000003 | BIOMETRIC DATA | tanaka | f_tanaka | | | | |
| 000004 | BIOMETRIC DATA | anthony | ikegami | m_ikegami | | | |
| 000005 | BIOMETRIC DATA | takayama | | | | | |
| ⋮ | | | | | | | |

FIG. 8

301b: MANAGEMENT TABLE

| MANAGEMENT NO. | REFERENCE BIOMETRIC DATA FIELD | ID STORING FIELD OF SERVICE SYSTEM A | ID STORING FIELD OF SERVICE SYSTEM B | ID STORING FIELD OF SERVICE SYSTEM C | ID STORING FIELD OF SERVICE SYSTEM D | ID STORING FIELD OF SERVICE SYSTEM E | ... |
|---|---|---|---|---|---|---|---|
| 000001 | BIOMETRIC DATA | ikegami01 | j_ikegami | 980116 | 00980116 | ikegami | |
| 000002 | BIOMETRIC DATA | marine | | | mamekuro | | |
| 000003 | BIOMETRIC DATA | tanaka | | | | f_tanaka | |
| 000004 | BIOMETRIC DATA | anthony | | m_ikegami | ikegami | | |
| 000005 | BIOMETRIC DATA | | takayama | | | | |
| .. | | | | | | | |

IDENTIFICATION INFORMATION INTEGRATED MANAGEMENT SYSTEM, IDENTIFICATION INFORMATION INTEGRATED MANAGEMENT SERVER, AND COMPUTER READABLE RECORDING MEDIUM RECORDING IDENTIFICATION INFORMATION INTEGRATED MANAGEMENT PROGRAM THEREON

CROSS REFERENCE TO RELATED APPLICATION(S)

This application is based upon and claims the benefit of priority of the prior Japanese Application No. 2008-155063 filed on Jun. 13, 2008 in Japan, the entire contents of which are hereby incorporated by reference.

FIELD

The present application relates to a technique applied to various service providing systems for performing authentication of a user (hereinafter, also referred to as a "user") by one-to-one verification method using identification information (hereinafter, also referred to as an "ID") and biometric information of the user. Especially, the present application relates to the technique preferably used in a case in which the biometric information of the same user is registered in a plurality of service providing systems while being associated with different identification information.

BACKGROUND

Generally, in the various service providing systems, the ID and the biometric information of the user are associated with each other and registered in advance, and a predetermined service for the relevant user is started to be provided after performing authentication of the relevant user by the one-to-one verification method. At the time of user authentication, the user inputs his/her ID and biometric information (such as a fingerprint, a palm print, vein information, iris, and a vocal print). Then, on the service providing system side, registered biometric information associated with the ID input by the user is read out, the registered biometric information and the biometric information input by the user are compared and verified, and when they conform to each other, the user authentication is performed.

In an environment in which there are a plurality of service providing systems, there is a case in which the same user sets different passwords for each system. On the other hand, in the system adopting biometric authentication in place of password authentication, the user is authenticated as himself/herself not by verifying the password but by verifying the biometric information, so that the user is not required to remember the password.

The ID to be registered in the system, however, is determined on the first-come-first-served basis if not specified by a manager, so that when the ID that the user wants to set is already used in the system, the user should use another ID (ID not yet used in the system). As a result, there is a case in which the same user uses different IDs in a plurality of systems. Also, in the system in which the manager specifies the ID, if a naming method of ID varies from manager to manager of the systems, there is a case in which the same user uses different IDs in a plurality of systems.

The service providing system, which that is required to maintain high security often uses one-to-one authentication method so as to minimize a risk of false acceptance when adopting the biometric authentication. In this one-to-one authentication method, as described above, an individual is specified by the ID, and the reference biometric data of the user associated with the ID is read out from the data already registered in a database to verify the reference biometric data against the biometric data input by the user. Therefore, the user is required to input the ID for logging in to the service providing system. At that time, the user should correctly input the ID registered in advance in the service providing system to which the user wants to login. Therefore, when different IDs are registered for each service providing system, the user should correctly remember which ID is registered in which service providing system. As a result, there is a case of inputting the ID registered in a service providing system B by mistake while trying to log in to a service providing system A, for example, even though the biometric data, which may serve as the password, is correctly input, so that a case in which the user authentication cannot be performed often occurs.

Japanese Patent Application Laid-Open No. 2001-236324 discloses the technique to cope with such a situation. The technique disclosed in Japanese Patent Application Laid-Open No. 2001-236324 copes with the situation in which, when the user utilizing a plurality of applications or a plurality of bank accounts uses different passwords or personal identification numbers for each application ID or each bank account, respectively, the user cannot remember which password or personal identification number correspond to which application ID or bank accounts, respectively. Then, an object of the technique disclosed in Japanese Patent Application Laid-Open No. 2001-236324 is to provide a portable electronic device that ensures high security performance for secret information (password and personal identification number) by protecting and guarding the secret information by adopting personal authentication by the biometric information, which cannot be stolen or copied.

The above-described portable electronic device has a personal authentication function by the biometric information and is carried by an owner to perform processes on various pieces of electronic information. In the above-described electronic device, as a result of verification of verification biometric characteristic information of an authentication target against reference biometric characteristic information, when the verification biometric characteristic information is recognized to be that of the owner, personal identification code and account information corresponding to high-level information specified by a system name selecting unit are displayed on a display unit. Also, in the above-described portable electronic device, the personal identification code including the password, the personal identification number, a secret key or the like is stored while being associated with the account information including an account name, an ID, a computer name, an IP address, and the like, and the high-level information including a system name, a bank name, a computer name, an application name or the like. Thereby, when the user selects the target system by the system name selecting unit after the user authentication, the corresponding personal identification code and the account information are displayed on the display unit, so that the above-described personal electronic device may support not only forgetting of the password but also forgetting of the ID.

In the technique disclosed in Japanese Patent Application Laid-Open No. 2001-236324, for the forgetting of the ID of the user, when the user authentication is performed by the biometric authentication, the secret information including the ID for the system is read out and presented to the user in a view format. Then, when the display target system is selected by the system name selecting unit, the information of the selected system is displayed. To display pieces of registration information and notify the user of the same, however, is to show the user unnecessary secret information also, so that there is a problem in building the system requiring high security. Also, the user should consequently select from a plurality of IDs, so that there is a problem in convenience.

In addition, as a generally known method, there is the verification method referred to as a 1:N verification method. In this 1:N verification method, the user does not input the ID but inputs only the verification biometric data, and the verification biometric data is verified against a plurality of registered reference biometric data, thereby an individual is specified from a plurality of registered users. However, in the 1:N verification method, since the specification of the ID is not necessary, the convenience thereof is improved; on the other hand, since the verification biometric data is verified against the reference biometric data of a plurality of users, there is a possibility of accepting anyone else by mistake (false acceptance). A false acceptance rate increases in proportion to increase in the number N of the reference biometric, which is the verification target, so that the 1:N verification method is not preferably adopted in the system requiring high security. However, if the number N of the user capable of performing the 1:N verification is limited, it is not possible to help out all the users.

Further, as another generally known method, there is a method of unifying the IDs by using an IC card with unique information written therein. However, with this method, it is not possible to access the service providing system without the IC card and a card reader. When adopting the biometric authentication, the biometric data is the information included in a part of a living body, so that the user never forgets to carry the data. On the other hand, if the user is required to carry the IC card and the card reader only for unifying the ID, a cost will increase and the burden on the user increases.

SUMMARY

An identification information integrated management system herein disclosed has a plurality of service providing systems and a management server as follows. Each of the service providing systems performs authentication of a user by using identification information and biometric information of the relevant user, and then starts to provide a predetermined service to the relevant user. The management server performs integrated management of the identification information and the biometric information used for user authentication in the service providing systems. The management server has an obtaining unit, a storing unit, a first comparing unit, a first judging unit, and an updating unit as described below. The obtaining unit obtains identification information and reference biometric information registered in each of the service providing systems by the user from each of the service providing systems as registration target identification information and registration target reference biometric information, respectively. The storing unit may register and store the registration target identification information obtained by the obtaining unit and the registration target reference biometric information in association with each other. The first comparing unit compares the registration target reference biometric information obtained by the obtaining unit and registered reference biometric information having been stored in the storing unit. The first judging unit judges presence or absence of registered reference biometric information conforming to the registration target reference biometric information based on a comparison result by the first comparing unit. The updating unit updates the information in the storing unit so as to store the registration target identification information and the registration target reference biometric information in the storing unit as registered identification information and registered reference biometric information, when the first judging unit judges that registered reference biometric information conforming to the registration target reference biometric information is not present.

Also, the identification information integrated management server herein disclosed performs the integrated management of the identification information and the biometric information used for the user authentication in the above-described plurality of service providing systems. This identification information integrated management server has the obtaining unit, the storing unit, the first comparing unit, the first judging unit, and the updating unit described above.

Further, an identification information integrated management program recorded in a computer readable recording medium herein disclosed allows a computer to serve as the obtaining unit, the storing unit, the first comparing unit, the first judging unit, and the updating unit described above.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 8 is a view showing a configuration example of a management table in the identification information integrated management server shown in FIG. 7;

DESCRIPTION OF EMBODIMENTS

Figure 1:
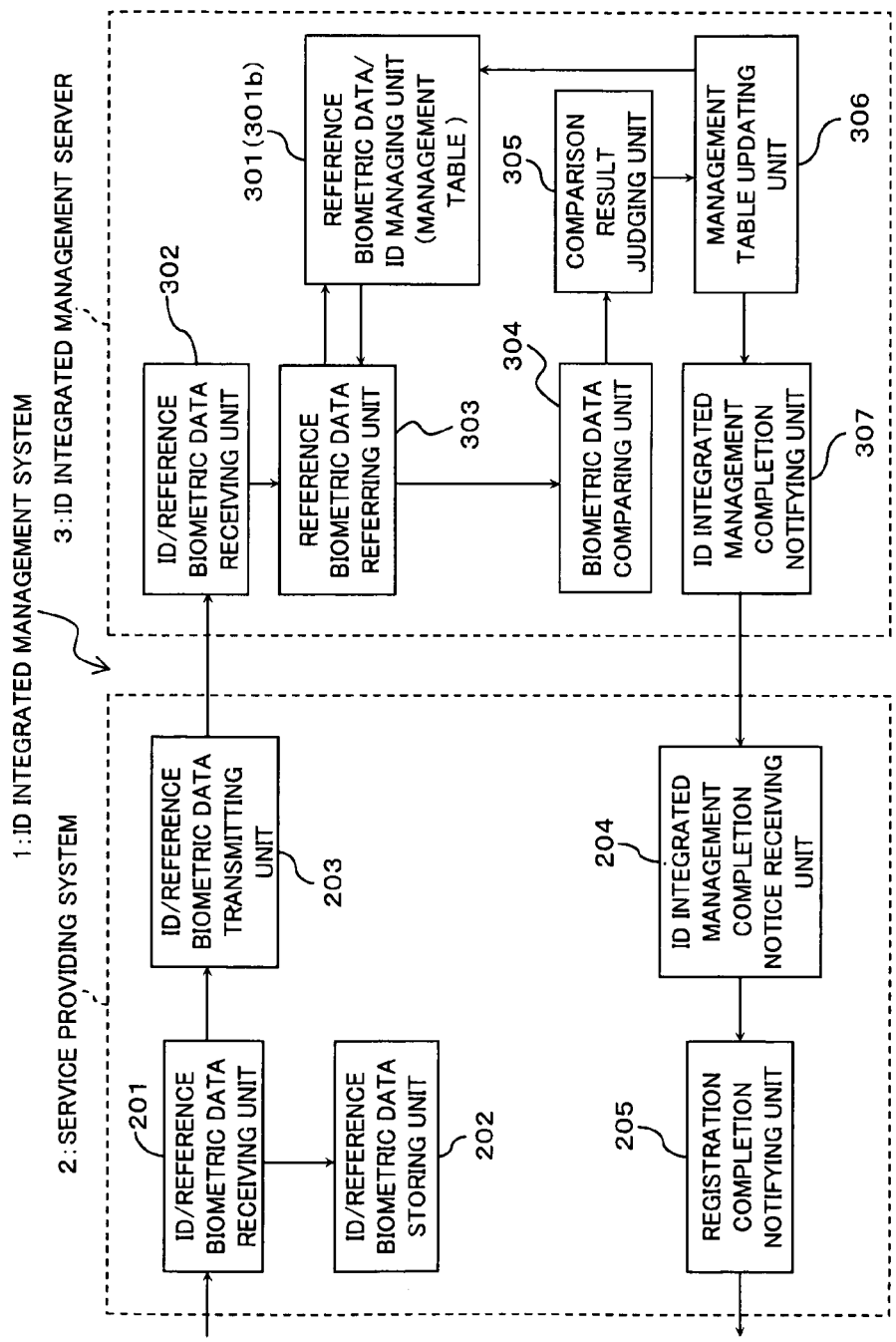
FIG. 1 is a block diagram showing a configuration of an identification information integrated management system (registration processing system of a service providing system and an identification information integrated management server) as one embodiment.

Hereinafter, an embodiment is described with reference to drawings.

[1] Basic Process

Basic operation of an ID integrated management system of this embodiment is described.

In the ID integrated management system of this embodiment, when a user registers his/her ID and reference biometric data (reference biometric information) in one of service providing systems (service providing servers) belonging to this ID integrated management system, the information is transmitted from the relevant service providing system to an ID integrated management server. Then, ID management by the reference biometric data is performed in the ID integrated management server belonging to this ID integrated management system, and when the user inputs a wrong ID at the time of verification before starting to provide a service by the relevant service providing system, a correct ID of the relevant user is found.

In order to realize such a process, the following registration process is first executed in this ID integrated management system. That is to say, in the service providing system, which adopts a one-to-one authentication method using the biometric information, the user inputs the reference biometric data for reference at the time of verification from a site of a living body, and specifies the ID to make a user registration request to the service providing system as in the case of a general registration process. A processing flow so far is known, so that a detailed description thereof is not given.

Upon reception of the user registration request, the service providing system registers and stores the received ID and reference biometric data in a database (refer to a storing unit 202 in FIG. 1 or the like) in its own system, and transmits them to the ID integrated management server.

The ID integrated management server compares and verifies the reference biometric data received from the service providing system and the reference biometric data already registered in the database (refer to management tables 301a and 301b in FIGS. 2 and 8) of the ID integrated management server.

When the ID integrated management server judges that biometric data conforming to the received reference biometric data is not present in the database (management tables 301a and 301b) as a result of comparison and verification, the ID integrated management server creates a new record in the database. Then, the reference biometric data and the ID received from the service providing system are associated with each other and registered and stored in the record.

On the other hand, when the ID integrated management server judges that the biometric data conforming to the received reference biometric data is present in the database (management tables 301a and 301b) as a result of comparison and verification, the ID integrated management server registers the ID received from the service providing system in a corresponding record. In this case, it is not required that the reference biometric data is necessarily stored.

Next, a processing flow until the correct ID of the relevant user is determined when the user inputs the wrong ID at the time of verification in the service providing system in this ID integrated management system is described.

Herein, for example, a case in which the user inputs a login ID for a service providing system B by mistake while trying to log in to a service providing system A, and creates predetermined verification biometric data from the site of the living body such as a fingerprint and a vein to input, thereby making a user authentication request to the service providing system A is described. Meanwhile, in this embodiment, it is assumed that the authentication is performed using the same kind of biometric data in the service providing systems A and B, and both of the service providing systems A and B belong to this ID integrated management system.

At that time, there is a case in which the ID identical to the ID that is input by the user by mistake, is registered in the database (storing unit 202) of the service providing system A, and a case in which the identical ID is not registered. In the former case, the registered ID is the ID of anyone other than the relevant user. Therefore, when the reference biometric data associated with the ID of anyone else and the verification biometric data input by the relevant user are compared and verified, the data do not conform to each other, so that the authentication of the relevant user fails. On the other hand, in the latter case, since the identical ID is not present, the comparison and verification with the reference biometric data cannot be performed, so that the authentication of the relevant user cannot be performed.

In both cases, the service providing system A judges that the user possibly specifies the wrong ID, and transmits the ID and the verification biometric data input by the user to the ID integrated management server. In the ID integrated management server, when the ID input by the relevant user is found in the database (management tables 301a and 301b), one or more reference biometric data registered in the record indicated by the ID and the verification biometric data received from the service providing system A are compared to each other.

When the reference biometric data conforming to the verification biometric data is not found as a result of comparison, the ID integrated management server notifies the service providing system A of the user authentication failure, and the service providing system A terminates the process with the user authentication failure. Meanwhile, when the ID input by the relevant user is not found in the database (management tables 301a and 301b) also, the ID integrated management server notifies the service providing system A of the user authentication failure, and the service providing system A terminates the process with the user authentication failure.

On the other hand, when the reference biometric data conforming to the verification biometric data is found as a result of comparison, the ID integrated management server groups (lists) one or more ID associated with the conformed reference biometric data to return to the service providing system A.

Then, the service providing system A searches in its own database (storing unit 202) to confirm whether or not there is an ID conforming to a plurality of IDs or a unique ID returned from the ID integrated management server as described above in the IDs registered in the database (storing unit 202). When the ID returned from the ID integrated management server is not found in the database (storing unit 202), the service providing system A judges that the relevant user is not registered in the relevant service providing system A and terminates the process with the user authentication failure.

On the other hand, when the ID returned from the ID integrated management server is found in the database (storing unit 202), the service providing system A compares the reference biometric data associated with the ID and the verification biometric data received from the user. As a result of the comparison, when the data do not conform to each other, the service providing system A terminates the process with the user authentication failure. When the data conform to each other, the service providing system A authenticates the relevant user as himself/herself even when the wrong ID input by the relevant user is not registered in the database (storing unit 202).

Meanwhile, at that time, when a plurality of IDs are returned from the ID integrated management server, there is a case in which two or more IDs out of a plurality of IDs are registered and present in the database (storing unit 202) of the service providing system A. In such a case, each of two or more reference biometric data associated with the two or more IDs, respectively, and the verification biometric data received from the user are compared and verified in the service providing system A.

As a result of the comparison and verification, when the reference biometric data conforming to the verification biometric data is not present, the service providing system A terminates the process with the user authentication failure. Also, when the reference biometric data conforming to the verification biometric data is present as a result of the comparison and verification, the service providing system A specifies one ID associated with the reference biometric data conforming to the verification biometric data out of a plurality of IDs, thereby finally specifying one user.

Herein, it is assumed that the login ID for the service providing system A and the login ID for the service providing system B are registered and stored in advance in the database (management tables 301a and 301b) of the ID integrated management server while being associated with the reference biometric data of the relevant user. At that time, it is assumed that the user inputs the login ID for the service providing system B by mistake while trying to log in to the service providing system A and creates the predetermined verification biometric data from the site of the living body such as the fingerprint and the vein to input, thereby making the user authentication request to the service providing system A.

In this case, regardless of whether or not the wrong login ID is registered in the database (storing unit 202) of the service providing system A, the service providing system A consequently judges that the user possibly specifies the wrong ID, and transmits the ID and the verification biometric data input by the user to the ID integrated management server.

In the ID integrated management server, the login ID of the relevant user for the service providing system B is found in the database (management tables 301a and 301b), the reference biometric data registered in the record indicated by the ID and the verification biometric data received from the service providing system A are compared to each other, and the data are conformed to each other. Then, the ID integrated management server returns the ID associated with the conformed reference biometric data (herein, one ID of the relevant user other than the ID for the service providing system B; that is to say, the login ID for the service providing system A) to the service providing system A.

Upon reception of the returned ID, the service providing system A searches in its own database (storing unit 202) to find the ID, which conforms to the ID returned from the ID integrated management server, out of the IDs registered in the database (storing unit 202). Thereafter, the service providing system A compares the reference biometric data associated with the ID and the verification biometric data received from the user. At that time, the compared data conform to each other. Therefore, the service providing system A recognizes that the correct ID of the relevant user in the service providing system is specified even though the wrong ID input by the relevant user is not registered in the database (storing unit 202), and authenticates the relevant user as himself/herself.

In this manner, the ID integrated management server performs the integrated management of the IDs and the reference biometric data registered in a plurality of service providing systems. Thereby, it becomes possible to perform the authentication of the relevant user even when the user inputs the ID registered in the different service providing system by mistake while trying to log in to the target service providing system, without increase in a device cost and burden on a user, and while maintaining security.

[2] Specific Configuration and Operation

[2-1] One Embodiment of Registration Processing System

Figure 2:
FIG. 2 is a view showing a configuration example of a management table in the identification information integrated management server of this embodiment.

FIG. 1 is a block diagram showing a configuration of an identification information integrated management system (registration processing system of the service providing system and the identification information integrated management server) as one embodiment, and FIG. 2 is a view showing a configuration example of the management table in the identification information integrated management server of this embodiment.

As shown in FIG. 1, an identification information integrated management system (ID integrated management system) 1 of this embodiment is composed of a plurality of service providing system (service providing servers) 2 and one identification information integrated management server (ID integrated management server; management server) 3. Meanwhile, although only one service providing system 2 is shown in FIG. 1, two or more systems 2 are actually provided.

Each of the service providing systems 2 starts to provide a predetermined service for the relevant user after performing the authentication of the relevant user by using the ID and the biometric information of the user. Also, the ID integrated management server 3 performs the integrated management of the ID and the biometric information used in the user authentication in a plurality of service providing systems 2 in the following manner.

The registration processing system of each of the service providing systems 2 is composed of an ID/reference biometric data receiving unit 201, an ID/reference biometric data storing unit 202, an ID/reference biometric data transmitting unit 203, an ID integrated management completion notice receiving unit 204, and a registration completion notifying unit 205.

The ID/reference biometric data receiving unit 201 receives registration data for the relevant service providing system 2 from the user (client). The registration data includes the ID (such as a character string including a predetermined number of alphanumeric characters) specified by the user and the predetermined reference biometric data (reference biometric information) obtained from the predetermined site of the living body of the user. Meanwhile, the same kind of biometric information is used for the authentication in a plurality of service providing systems 2.

The ID/reference biometric data storing unit (database) 202 stores the registration data received by the receiving unit 201. The storing unit 202 stores the reference biometric data while being associated with the ID specified by the user. At the time of verification to be described later, the reference biometric data associated with the ID is read out from the storing unit 202 by searching in the storing unit 202 by the ID input by the user.

Meanwhile, when the ID identical to the ID specified by the user received by the receiving unit 201 is already registered in the storing unit 202 at the time of registration, the user is warned of this and a process to urge the user to specify another ID or the like is performed. Since such a processing flow is known, the description thereof is not given.

The ID/reference biometric data transmitting unit (registration target information transmitting unit) 203 transmits the ID and the reference biometric data of the user received by the receiving unit 201 to the ID integrated management server 3 as a registration target ID and registration target reference biometric information, respectively, when registering and storing them in the storing unit 202, and requests the management of the ID and the data.

An ID integrated management completion notice receiving unit (update result receiving unit) 204 receives an ID integrated management completion notice (to be described later) from the ID integrated management server 3.

The registration completion notifying unit 205 notifies the user of the ID integrated management completion notice received by the receiving unit 204 as the registration completion notice.

On the other hand, the registration processing system of the ID integrated management server 3 is composed of a reference biometric data/ID managing unit 301, an ID/reference biometric data receiving unit 302, a reference biometric data referring unit 303, a biometric data comparing unit 304, a comparison result judging unit 305, a management table updating unit 306, and an ID integrated management completion notifying unit 307.

The reference biometric data/ID managing unit (storing unit; database) 301 is capable of associating the registration target ID and the registration target reference biometric data obtained by a receiving unit 302 to be described later with each other, and of registering and storing them as a registered ID and registered reference biometric, respectively. In the managing unit 301, the registration target ID and the registration target reference biometric data are stored and managed in a form of the management table 301a in which the registration target ID is associated with the registration target reference biometric data as shown in FIG. 2, for example.

In the management table 301a shown in FIG. 2, the record to which a management number (management No.) is given is created in a registration order and for each registration target reference biometric data. Each record is composed of a field for storing the reference biometric data and one or more ID management field for storing the ID (registration target ID) associated with the reference biometric data. Also, in the management table 301a, the number of ID management fields managed as one record is variably increased according to an addition of the ID, without being associated with each service providing system 2. Meanwhile, in the management table 301a shown in FIG. 2, five records to which management Nos. 000001 to 000005 are given are shown, and in one record to which the management No. 000001 is given, for example, different five IDs "ikegami01", "j_ikegami", "980116", "00980116" and "ikegami" are registered and stored in five ID management fields (1) to (5).

The ID/reference biometric data receiving unit (obtaining unit) 302 receives the ID and the reference biometric data registered by the user in each service providing system 2 from each service providing system 2 (transmitting unit 203) as the registration target ID and the registration target reference biometric data, respectively, to obtain them.

The reference biometric data referring unit 303 refers to the reference biometric data already managed in each record of the management table 301a.

The biometric data comparing unit (first comparing unit) 304 compares the registration target reference biometric data obtained by the receiving unit 302 and the registered reference biometric data already stored in the management table 301a. That is to say, the comparing unit 304 compares and verifies the registration target reference biometric data taken out of data obtained by the receiving unit 302 and the registered reference biometric data referred to by the referring unit 303.

The comparison result judging unit (first judging unit) 305 judges whether the registered reference biometric data conforming to the registration target reference biometric data is present (whether the data is stored in the management table 301a), based on the comparison result by the comparing unit 304.

The management table updating unit (updating unit) 306 updates information (registration status) of the management table 301*a* as follows according to the judgment result by the comparison result judging unit 305.

When the comparison result judging unit 305 judges that the registered reference biometric data conforming to the registration target reference biometric data is not present in the management table 301*a*, the updating unit 306 stores the registration target ID and the registration target reference biometric data in the management table 301*a* as the registered ID and the registered reference biometric data, respectively. That is to say, the updating unit 306 creates a new record in the management table 301*a* and registers and stores the registration target reference biometric data in the biometric data field of the relevant record, and registers and stores the registration target ID in one ID management field (1) associated with the relevant field.

Also, when the comparison result judging unit 305 judges that the registered reference biometric data conforming to the registration target reference biometric data is present in the management table 301*a*, the updating unit 306 stores the registration target ID in the management table 301*a* as the registered ID associated with the relevant registered reference biometric data. That is to say, the updating unit 306 refers to the record of the registered reference biometric data conforming to the registration target reference biometric data, provides a new ID management field next to the last ID management field in the record, and registers and stores the registration target ID in the field.

For example, when the registration target reference biometric data conforms to the reference biometric data in the record to which the management No. 000005 is given in the management table 301*a* shown in FIG. 2, since the ID "takayama" is already registered in the ID management field (1), the registration target ID this time is registered and stored in a next ID management field (2).

At that time, only when the registered ID identical to the registration target ID is not registered yet for the relevant registered reference biometric data in the management table 301*a*, the updating unit 306 stores the registration target ID in the management table 301*a* as the registered ID associated with the relevant registered reference biometric data. That is to say, when the registered ID identical to the registration target ID is already registered for the relevant registered reference biometric data in the management table 301*a*, the updating unit 306 does not register the relevant registration target ID in the management table 301*a*. Thereby, it is prevented that the same ID is redundantly registered for the same registered reference biometric data, and waste of the field of the management table 301*a* is prevented.

Also, the updating unit 306 may have a function of updating the information of the management table 301*a* so as to replace the relevant registered reference biometric data by newest registration target reference biometric data received and obtained by the receiving unit (obtaining unit) 302 when updating the information of the management table 301*a*. That is to say, when there is the data conforming to the registration target reference biometric data in the registered reference biometric data in the management table 301*a*, the updating unit 306 may function to replace the conformed registered reference biometric data with the reference biometric data received by the receiving unit 302 this time, in the associated record. By such replacing update, it becomes possible to replace the reference biometric data of the relevant user in the management table 301*a* with the newest one, when the user additionally registers a new ID.

When the updating unit 306 completes the update of the management table 301*a*, the ID integrated management completion notifying unit 307 notifies the service providing system 2, which has transmitted the registration target ID and the registration target reference biometric data, of the completion.

Meanwhile, when each service providing system 2 has an updating function of updating the reference biometric data in the relevant service providing system 2 (storing unit 202) after the registration of the reference biometric data by the user, the following updating process may be further performed. That is to say, when the user updates his/her own reference biometric data to the newest one by using the above-described updating function (when he/she inputs the newest reference biometric data to replace the biometric data of the storing unit 202), the following updating process is performed.

The transmitting unit 203 transmits the updated newest reference biometric data to the ID integrated management server 3. In the ID integrated management server 3, the comparing unit 304 compares the relevant reference biometric data received by the receiving unit 302 and the registered reference biometric data already stored in the management table 301*a*. Thereafter, the comparison result judging unit 305 judges presence or absence of the registered reference biometric data conforming to the relevant reference biometric data, based on the comparison result by the comparing unit 304. That is to say, the comparison result judging unit 305 judges presence or absence of the record that holds the registered reference biometric data conforming to the relevant reference biometric data.

Then, when the comparison result judging unit 305 judges that there is the registered reference biometric data conforming to the relevant reference biometric information, the updating unit 306 updates the information of the management table 301*a* so as to replace the registered reference biometric information in the associated record with the relevant reference biometric information. When the conforming registered reference biometric data (record) is not present, the updating unit 306 does not perform any process for the management table 301*a*.

Next, operation of the registration process of the ID integrated management system 1 (registration processing system of the service providing system 2 and the ID integrated management server 3) of this embodiment configured as above is described.

The ID integrated management system 1 of this embodiment functions effectively when the user registers the different IDs for each system and specific reference biometric data, for a plurality of the service providing system 2. That is to say, in the ID integrated management system 1 of this embodiment, when the same user specifies different IDs for a plurality of service providing systems 2 and registers the same type of reference biometric data associated with each ID, the ID is managed as the information associated with the reference biometric data by the ID integrated management server 3. Hereinafter, the registration process operation is described in more detail.

In the ID integrated management system 1 of this embodiment, the ID integrated management server 3 holds relationship between the reference biometric data indicating a specific individual and a plurality of IDs registered by the specific individual indicated by the reference biometric data in a plurality of service providing systems 2 as the management table 301*a* (refer to FIG. 2).

When the user inputs the wrong ID when logging in to the service providing system 2 belonging to this system 1, there is a case in which the verification biometric data input by the user at the same time as the relevant ID and the reference biometric data associated with the relevant ID registered in the storing unit 202 do not conform to each other, and a case in which the specified ID itself is not present.

In such a case, in the ID integrated management system 1 of this embodiment, as described later with reference to FIG. 9 for a verification processing system, it is assumed that the user specifies the wrong ID, and the ID and the verification biometric data received from the user are transmitted from the service providing system 2 to the ID integrated management server 3.

Then, the ID integrated management server 3 searches in the above-described management table 301a of the same by the ID received from the service providing system 2. When the specified ID is present in the management table 301 as a result of the search, the reference biometric data associated with the ID and the verification biometric data input by the user are compared with each other and verified. When the reference biometric data conforming to the verification biometric data is found as a result of the comparison and verification, a plurality of or unique ID associated with the reference biometric data is returned to the originating service providing system 2.

In the service providing system 2 to which the ID is returned, it is judged whether there is the ID conforming to the ID stored in the storing unit 202 thereof, in the returned ID. When there is the conforming ID, the reference biometric data associated with the ID and registered in the storing unit 202 and the verification biometric data input by the user are compared and verified. When the data conform to each other, the ID is judged to be the correct ID of the relevant user in the relevant service providing system 2, and thereby the system 1 capable of surely specifying the correct ID is provided.

When performing such a process, in the registration processing system of the ID integrated management system 1 of this embodiment configured as shown in FIG. 1, in order to manage the relationship between the reference biometric data and the ID registered by the user in each service providing system 2 by the ID integrated management server 3, following registration process is performed.

A flow of the process in which the user determines his/her ID to be registered in the service providing system 2 and collects the reference biometric data, and tries to register the ID and the reference biometric data in the service providing system 2 is known, so that the description thereof is not given. Similarly, the process in which the service providing system 2 creates the record in the storing unit 202 by the ID of which registration is requested by the user and associates the reference biometric data with the ID to store in the record is already known, so that the description thereof is not given.

The service providing system 2 stores the data received from the user (client) by the ID/reference biometric data receiving unit 201 in the storing unit (database) 202.

Meanwhile, at that time, when the ID specified by the user is already registered in the storing unit 202 of the service providing system 2, this system 2 performs the process to warn the user of the same and urges the user to specify another ID, but, since the flow of the process also is already known as described above, the description thereof is not given. In this manner, the ID and the reference biometric data received by the receiving unit 201 and newly registered in the storing unit 202 are transmitted to the ID integrated management server 3 by the transmitting unit 203, and the management of the ID and the data is requested.

In the ID integrated management server 3, the registration target ID and the registration target reference biometric data are taken out from the data received from the service providing system 2 by the receiving unit 302. Also, the referring unit 303 refers to the reference biometric data already managed in each record of the management table 301a one by one. Then, the comparing unit 304 compares and verifies each biometric data referred to by the referring unit 303 and the registration target reference biometric data received from the service providing system 2.

When the comparison result judging unit 305 judges that the registered reference biometric data conforming to the registration target reference biometric data is present in the management table 301a, the updating unit 306 newly adds the registration target ID in the record associated with the relevant registered reference biometric data in the management table 301a.

At that time, the updating unit 306 may replace the registered reference biometric data in the management table 301a with the registration target reference biometric data received from the service providing system 2. Thereby, the reference biometric data held in the management table 301a may be updated to the newest one at that point in time, and the biometric data, which is the closest to a current condition of the living body of the user, is stored and registered. Therefore, when there are a plurality of service providing systems 2, the newest reference biometric data at the time of registration by the user is held and managed by the ID integrated management server 3.

On the other hand, when the comparison result judging unit 305 judges that the registered reference biometric data conforming to the registration target reference biometric data is not present in the management table 301a, the updating unit 306 adds the new record to the management table 301a. Then, the updating unit 306 additionally registers the registration target ID and the registration target reference biometric data in the record as the registered ID and the registered reference biometric data, respectively.

When the update of the management table 301a is completed in this manner, the ID integrated management completion notifying unit 307 notifies the service providing system 2, which has transmitted the registration target ID and the registration target reference biometric data, that the update of the management table 301a is completed. The completion notice is received by the receiving unit 204 of the service providing system 2, and further notified to the user (client) who has requested the registration process by the registration completion notifying unit 204, then the registration process is completed.

In this manner, by using the registration processing system of the system 1 shown in FIG. 1, the ID and the reference biometric data registered by the user in each service providing system 2 are managed by the management table 301a of the ID integrated management server 3. Thereby, it becomes possible to perform the ID integrated management using the management table 301a with the reference biometric data as a key.

Also, in the registration processing system of the system 1 shown in FIG. 1, the number of fields is variably increased according to the addition of the new registration of the ID without clear relationship between each service providing system 2 and the management table 301a of the ID integrated management server 3. Thereby, the ID may be flexibly managed without the need for the association between each service providing system 2 and the server 3.

Further, in the registration processing system of the system 1 shown in FIG. 1, when each service providing system 2 has the updating function of updating the reference biometric data registered in the storing unit 202, it is also possible to update the reference biometric data in the management table 301a of the ID integrated management server 3 to the newest one at the time of update using the updating function.

Thereby, the reference biometric data held in the management table 301a can be updated to the newest one at the time of update, and the biometric data that is the closest to the current condition of the living body of the user is stored and registered. Therefore, when there are a plurality of service providing systems 2, the newest reference biometric data at the time of update by the user is held in and managed by the ID integrated management server 3.

[2-2] First Variation of Registration Processing System

Figure 3:
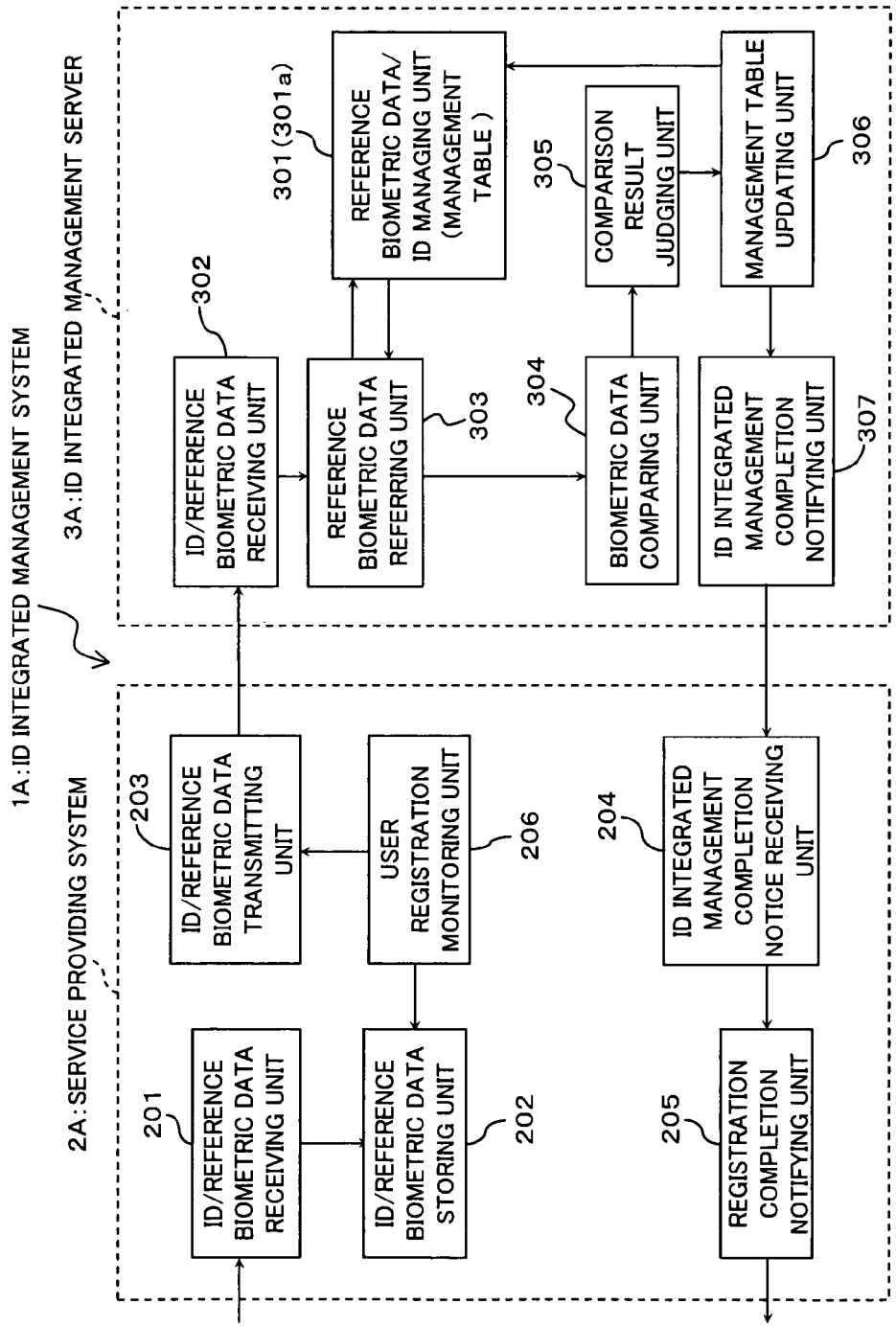
FIG. 3 is a block diagram showing a configuration of a first variation of the identification information integrated management system (registration processing system of the service providing system and the identification information integrated management server) as one embodiment.

FIG. 3 is a block diagram showing a configuration of a first variation of the identification information integrated management system (registration processing system of the service providing system and the identification information integrated management server) as one embodiment. Meanwhile, in FIG. 3, the reference numeral identical to the already mentioned reference numeral indicates the identical portion or the substantially identical portion, so that the description thereof is not given.

As shown in FIG. 3, an identification information integrated management system (ID integrated management system) 1A of the first variation is composed of a plurality of service providing systems (service providing servers) 2A, one identification information integrated management server (ID integrated management server; management server) 3A. Meanwhile, in FIG. 3 also, although only one service providing system 2A is shown, two or more systems are actually provided.

The ID integrated management server 3A has a configuration similar to that of the ID integrated management server 3 shown in FIG. 1, so that the description thereof is not given.

Although each service providing system 2A has a configuration substantially similar to that of each service providing system 2 shown in FIG. 1, in the registration processing system of each service providing system 2A, a user registration monitoring unit 206 is further added in addition to the receiving unit 201, the storing unit 202, the transmitting unit 203, the receiving unit 204, and the registration completion notifying unit 205 similar to those of each service providing system 2 shown in FIG. 1.

Herein, the user registration monitoring unit (monitoring unit) 206 added to each service providing system 2A monitors the registration request of the ID and the reference biometric data by the user to the relevant service providing system 2A.

When the monitoring unit 206 detects that the relevant service providing system 2A receives the registration request, the monitoring unit 206 allows the transmitting unit 203 to transmit the ID and the reference biometric data to the ID integrated management server 3A as the registration target ID and the registration target reference biometric data, respectively.

In each service providing system 2 in the system 1 shown in FIG. 1, when the receiving unit 201 receives the ID and the reference biometric data, the received ID and reference biometric data are registered in the storing unit 202 and the transmitting unit 203 directly transmits them to the ID integrated management server 3.

On the other hand, in each service providing system 2A in the system 1A shown in FIG. 3, the ID and the reference biometric data received by the receiving unit 201 are not directly transmitted by the transmitting unit 203. Instead, each service providing system 2A is provided with a module for monitoring the storing unit 202 (database) in the background such as a daemon process as the above-described monitoring unit 206.

The monitoring unit 206 monitors user registration status to the storing unit 202, and when a new user registration process, that is to say, the registration process of the new ID and reference biometric data is detected, the ID and the reference biometric data received from the user and registered in the storing unit 202 are automatically transmitted to the ID integrated management server 3A by the transmitting unit 203. Meanwhile, registration process operation in the ID integrated management server 3A is similar to the operation of the ID integrated management server 3 shown in FIG. 1, so that the description thereof is not given.

In this manner, in the system 1A of the first variation, the user registration is monitored by the module operating in the background (monitoring unit 206), and the ID integrated management may be performed by algorithm within the service providing system 2A without regard to communication with the ID integrated management server 3A. That is to say, the transmission from the service providing system 2A to the ID integrated management server 3A is possible only by adding the transmitting unit 203 and the monitoring unit 206 to each service providing system 2A without making a special change in the existing receiving unit 201 in the service providing system 2A.

[2-3] Second Variation of Registration Processing System

Figure 4:
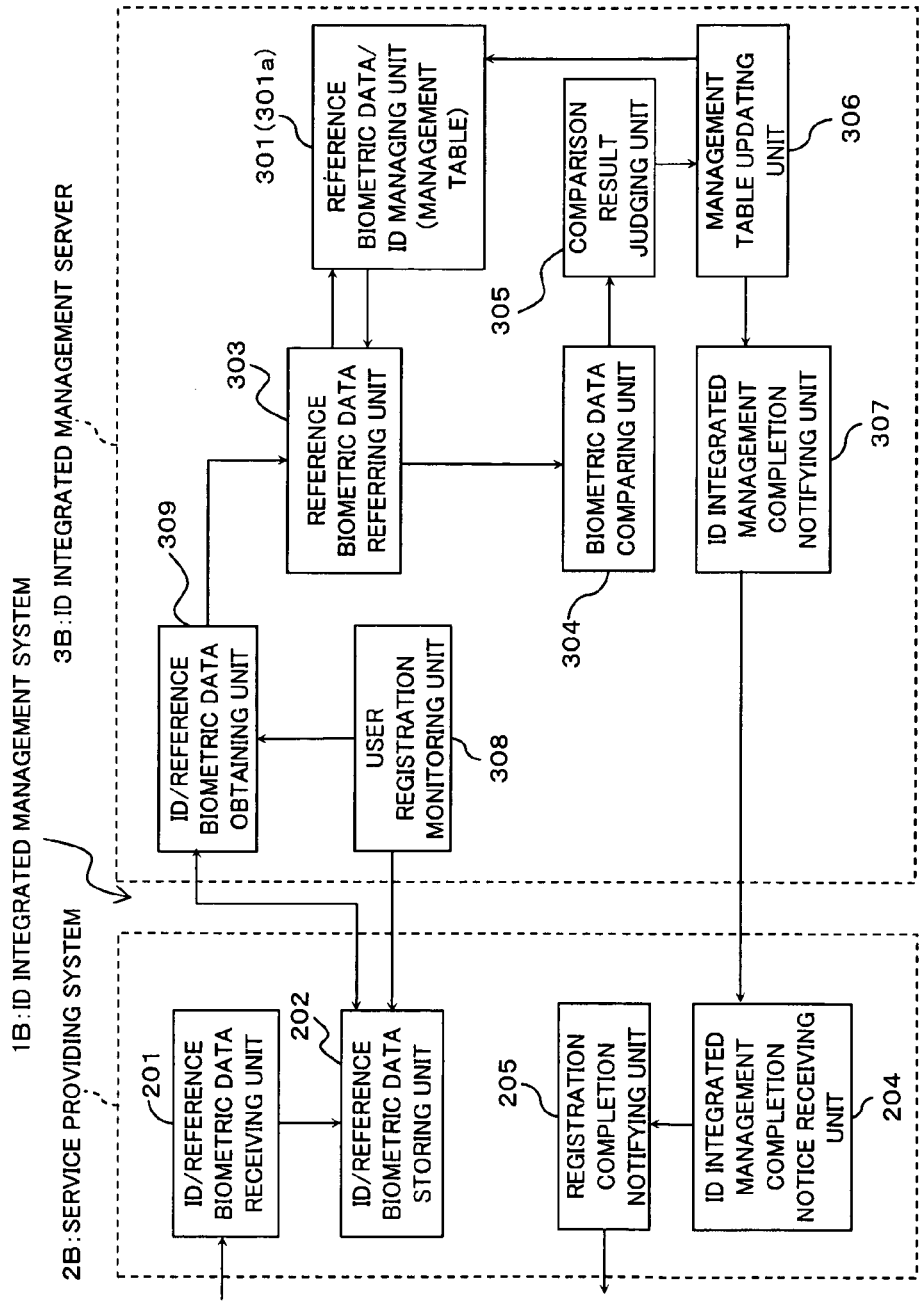
FIG. 4 is a block diagram showing a configuration of a second variation of the identification information integrated management system (registration processing system of the service providing system and the identification information integrated management server) as one embodiment.

FIG. 4 is a block diagram showing a configuration of a second variation of the identification information integrated management system (registration processing system of the service providing system and the identification information integrated management server) as one embodiment. Meanwhile, in FIG. 4, the reference numeral identical to the already mentioned reference numeral indicates the identical portion or the substantially identical portion, so that the description thereof is not given.

As shown in FIG. 4, an identification information integrated management system (ID integrated management system) 1B of the second variation is composed of a plurality of service providing systems (service providing servers) 2B and one identification information integrated management server (ID integrated management server; management server) 3B. Meanwhile, although only one service providing system 2B is shown in FIG. 4, two or more systems 2 are actually provided.

Each service providing system 2B has a configuration substantially similar to that of each service providing system 2 shown in FIG. 1, but the registration processing system of each service providing system 2B is provided with the receiving unit 201, the storing unit 202, the receiving unit 204, and the registration completion notifying unit 205, which are similar to those in each service providing system 2 shown in FIG. 1, and the transmitting unit 203 is not given.

Also, the ID integrated management server 3B has a configuration substantially similar to that of the ID integrated management server 3 shown in FIG. 1. However, the registration processing system of the ID integrated management server 3B of the second variation is provided with the managing unit 301 (management table 301a), the referring unit 303, the comparing unit 304, the comparison result judging unit 305, the updating unit 306, and the notifying unit 307 of the ID integrated management server 3 shown in FIG. 1, and is provided with a user registration monitoring unit 308 and an ID/reference biometric data obtaining unit 309 in place of the receiving unit 302 of the ID integrated management server 3.

Herein, the user registration monitoring unit (user registration monitoring unit) 308 monitors the registration status of the ID and the reference biometric data by the user in the storing unit 202 of each service providing system 2B.

When the user registration monitoring unit 308 detects the update of the ID and the reference biometric data of the user, the ID/reference biometric data obtaining unit (obtaining unit) 309 obtains the updated ID and reference biometric data as the registration target ID and the registration target reference biometric data, respectively.

In the system 1B of the second variation, the service providing system 2B (transmitting unit 203) does not transmit the ID and the reference biometric data received from the user to the ID integrated management server as in the systems 1 and 1A shown in FIGS. 1 and 3, respectively. Instead, the user registration monitoring unit 308 of the ID integrated management server 3B refers to and monitors the user registration status of the storing unit 202 of each service providing system 2B out of synchronization with each service providing system 2B.

Then, when the user registration monitoring unit 308 confirms the update (change) of the user registration status in the storing unit 202 of the service providing system 1B, the updated ID and reference biometric data are obtained from the storing unit 202 of the service providing system 1B of which update is confirmed as the registration target ID and the registration target reference biometric data, respectively, by the obtaining unit 309.

That is to say, in the system 1B of the second variation, the user registration information is not dynamically notified from the service providing system 2B side to the ID integrated management server 3B, but the user registration monitoring unit 308 on the ID integrated management server 3B side periodically accesses from the ID integrated management server 3B to the service providing system 2B. The user registration monitoring unit 308 is composed of, for example, a published protocol such as a lightweight directory access protocol (LDAP), which is a directory service access protocol. By confirming the user newly registered by the user registration monitoring unit 308, the information of the user is obtained from the service providing system 2B by the obtaining unit 309 on the ID integrated management server 3B side, and the integrated management of the ID is performed in the management table 301a.

In this manner, in the system 1B of the second variation, since the user update information of each service providing system 2B can be obtained from the ID integrated management server 3B side, it is not necessary to build the transmitting unit 203 of the service providing systems 2 and 2A in the service providing system 2B. Therefore, it becomes possible to realize the ID integrated management by the ID integrated management server 3B while minimizing change to the existing configuration of the service providing system 2B.

[2-4] Third Variation of Registration Processing System

Figure 5:
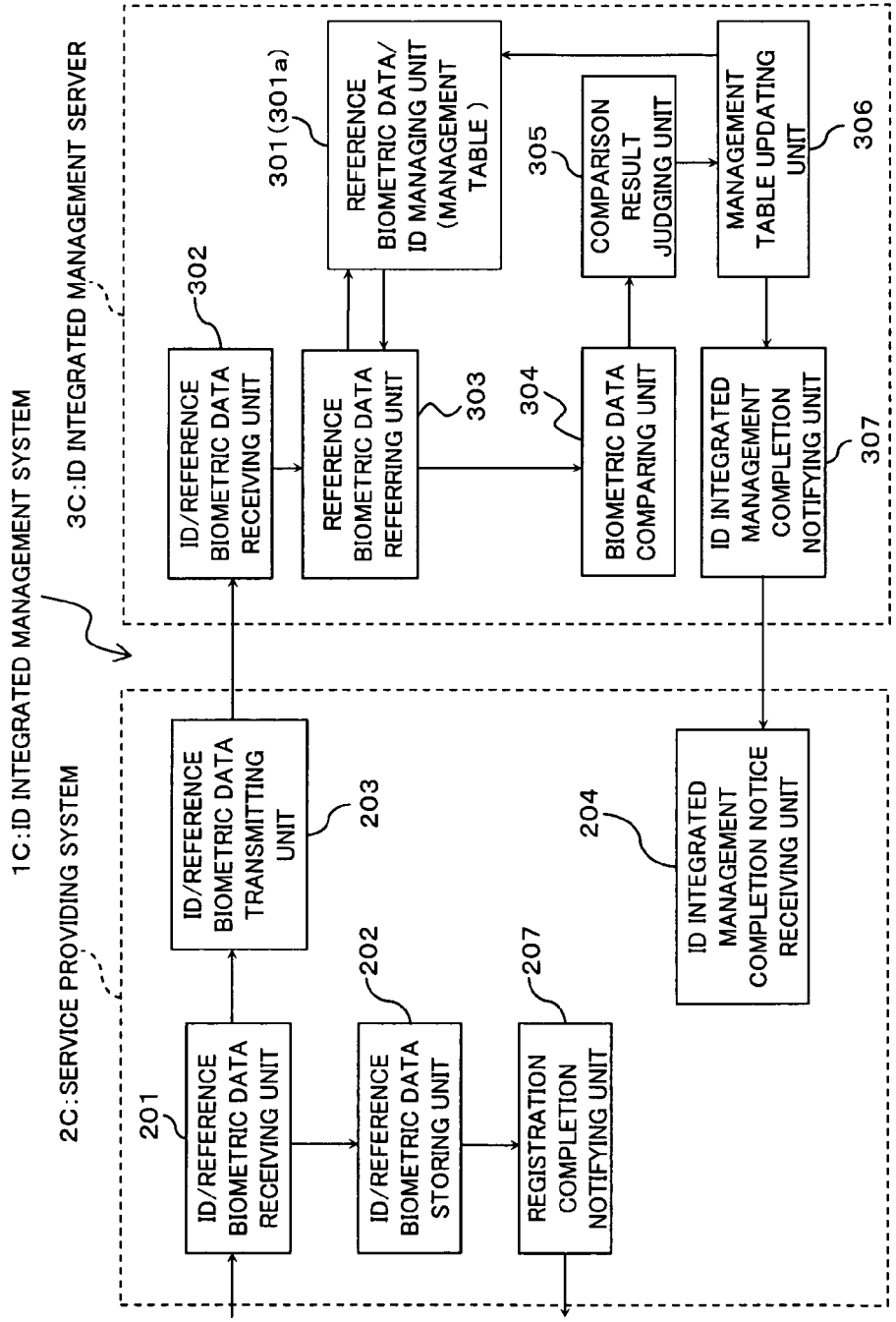
FIG. 5 is a block diagram showing a configuration of a third variation of the identification information integrated management system (registration processing system of the service providing system and the identification information integrated management server) as one embodiment.

FIG. 5 is a block diagram showing a configuration of a third variation of the identification information integrated management system (registration processing system of the service providing system and the identification information integration management server) as one embodiment. Meanwhile, in FIG. 5, the reference numeral identical to the already mentioned reference numeral indicates the identical portion or the substantially identical portion, so that the description thereof is not given.

As shown in FIG. 5, an identification information integrated management system (ID integrated management system) 1C of the third variation is composed of a plurality of service providing systems (service providing servers) 2C and one identification information integrated management server (ID integrated management server; management server) 3C. Meanwhile, in FIG. 5 also, although only one service providing system 2C is shown, two or more systems 2C are actually provided.

The ID integrated management server 3C has a configuration similar to that of the ID integrated management server 3 shown in FIG. 1, so that the description thereof is not given.

Although each service providing system 2C has a configuration substantially similar to that of each service providing system 2 shown in FIG. 1, the registration processing system of each service providing system 2C is provided with the receiving unit 201, the storing unit 202, the transmitting unit 203, and the receiving unit 204, which are similar to those of each service providing system 2 shown in FIG. 1, and is provided with a registration completion notifying unit 207 in place of the registration completion notifying unit 205.

When the receiving unit 204 receives the ID integrated management completion notice from the ID integrated management server 3, the registration completion notifying unit 205 in each service providing system 2 shown in FIG. 1 notifies the user of the ID integrated management completion notice as the registration completion notice.

On the other hand, the registration completion notifying unit 207 in each service providing system 2C of the third variation notifies the user of the registration completion at the time of registration completion of the ID and the reference biometric data of the user in the storing unit 202 in each service providing system 2C. Thereby, upon completion of the user registration in the storing unit 202, the notifying unit 207 returns the registration completion notice to the user at that point without waiting for the receiving unit 204 to receive the ID integrated management completion notice from the ID integrated management server 3C.

Therefore, in the service providing system 2C, upon completion of user registration in the storing unit 202, the notification unit 207 notifies the user of the registration completion before the registration control is shifted to the ID integrated management server 3C, and operation of an interface (I/F) between the user and the service providing system 2C can be finished. Originally, the user aims at only the user registration in the service providing system 2C, and it is not necessary that the user is aware of the I/F between the service providing system 2C and the ID integrated management server 3C. Therefore, by using the above-described notifying unit 207, it is possible to immediately return the registration completion notice to the user after the completion of the user registration in the storing unit 202, and it is possible to perform the ID management by the ID integrated management server while giving priority to response performance to the user.

[2-5] Fourth Variation of Registration Processing System

Figure 6:
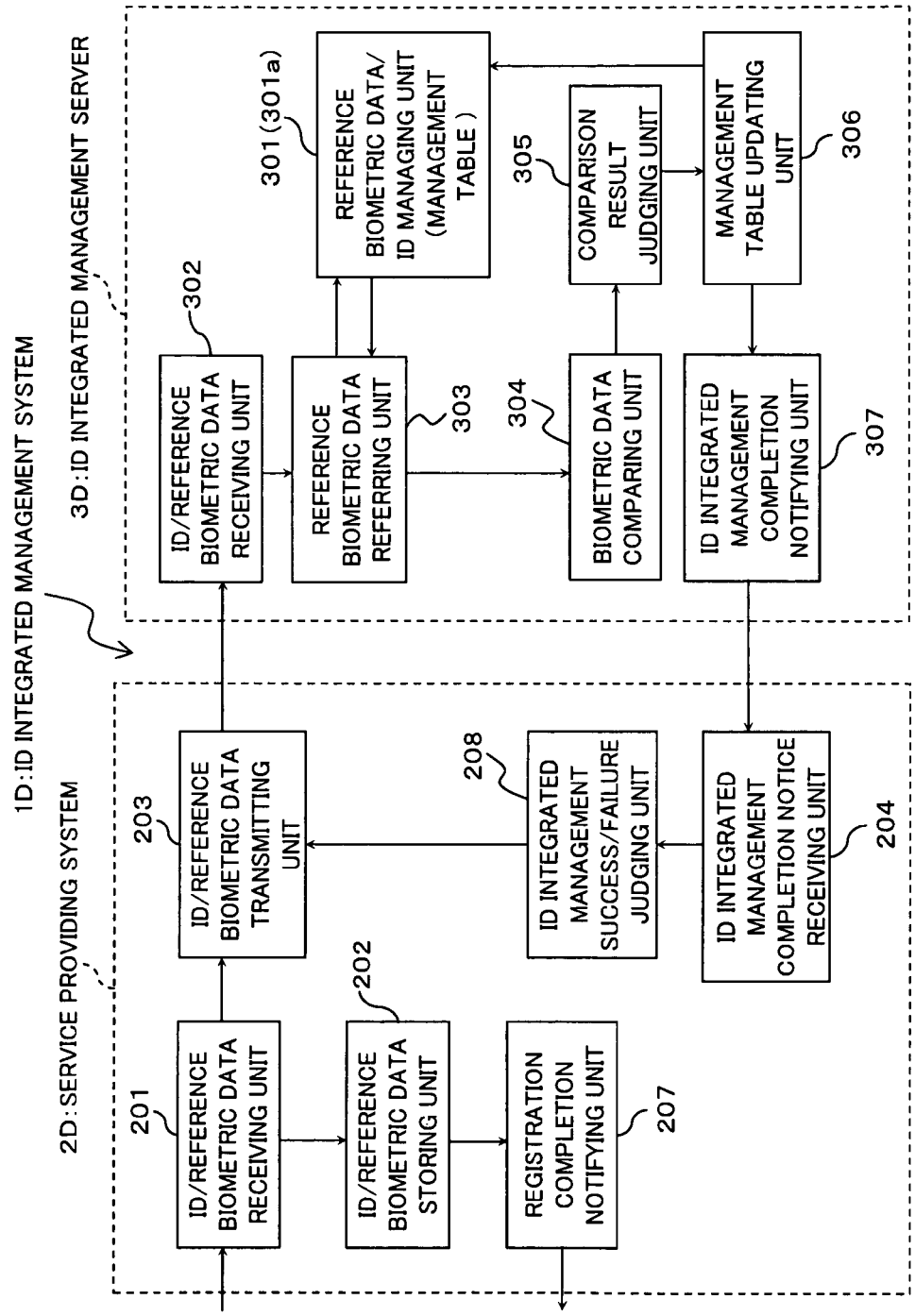
FIG. 6 is a block diagram showing a configuration of a fourth variation of the identification information integrated management system (registration processing system of the service providing system and the identification information integrated management server) as one embodiment.

FIG. 6 is a block diagram showing a configuration of a fourth variation of the identification information integrated management system (registration processing system of the service providing system and the identification information integrated management server) as one embodiment. Meanwhile, in FIG. 6, the reference numeral identical to the already mentioned reference numeral indicates the identical portion or the substantially identical portion, so that the description thereof is not given.

As shown in FIG. 6, an identification information integrated management system (ID integrated management system) 1D of the fourth variation is composed of a plurality of service providing systems (service providing servers) 2D and one identification information integrated management server (ID integrated management server; management server) 3D. Meanwhile, in FIG. 6 also, although only one service providing system 2D is shown, two or more systems 2D are actually provided.

The ID integrated management server 3D has a configuration similar to that of the ID integrated management server 3 shown in FIG. 1, so that the detailed description thereof is not given. Herein, the ID integrated management completion notifying unit 307 in the ID integrated management server 3D of the fourth variation realizes a function substantially similar to the function described above with reference to FIG. 1. However, the ID integrated management completion notifying unit 307 of the fourth variation functions as an update result notifying unit for notifying the service providing system 2D in which the user has registered the ID and the reference biometric data of the update result of the management table 301a by the updating unit 306. The update result includes success/failure information notifying whether the updating unit 306 has succeeded or failed in registration in the management table 301a.

Although each service providing system 2D has a configuration substantially similar to that of each service providing system 2C shown in FIG. 5, in the registration processing system of each service providing system 2D, an ID integrated management success/failure judging unit 208 is further added in addition to the receiving unit 201, the storing unit 202, the transmitting unit 203, the receiving unit 204, and the registration completion notifying unit 207, which are similar to those of each service providing system 2C shown in FIG. 5.

Herein, although the receiving unit 204 realizes the function substantially similar to that described above with reference to FIG. 1, the receiving unit 204 herein functions as an update result receiving unit for receiving the update result including the success/failure information from the ID integrated management server 3D (notifying unit 307).

In addition, the ID integrated management success/failure judging unit (update result judging unit) 208 judges whether the success/failure information included in the update result received by the receiving unit 204 is success or failure. When the judgment result is failed, that is to say, when the updating unit 306 fails in registration in the management table 301a, the judging unit 208 allows the transmitting unit 203 to transmit again the registration ID and the registration target reference biometric data, which cannot be updated, to the ID integrated management server 3D. On the other hand, when the judgment result is successful, that is to say, when the updating unit 306 succeeds in registering in the management table 301a, the judging unit 208 does not perform any process.

By including such judging unit 208, when the ID integrated management server 3D fails in performing the ID integrated management for any reason, the service providing system 2D may retry (request again) the ID management process (registration process) on the ID integrated management server 3D.

In the system 1D of the fourth variation also, similarly to the third variation, in the service providing system 2D, upon completion of the user registration in the storing unit 202, the notifying unit 207 notifies the user of the registration completion before the registration control is shifted to the ID integrated management server 3D, and the operation of the interface (I/F) between the user and the service providing system 2D is finished.

Therefore, if by any chance the ID integrated management server 3D fails in the registration process (ID integrated management) in the management table 301a, the operation of the I/F between the user and the service providing system 2D is finished, so that it is not possible to immediately request the user to input again the ID and the biometric data.

Therefore, by using the above-described judging unit 208, when the ID integrated management server 3D fails in the registration process in the management table 301a, it becomes possible to request again the ID integrated management about the same registration contents to the ID integrated management server 3D. Thereby, it becomes possible to surely perform the ID integrated management by retrying at the time of ID integrated management failure, while giving priority to the response performance to the user.

[2-6] Fifth Variation of Registration Processing System

Figure 7:
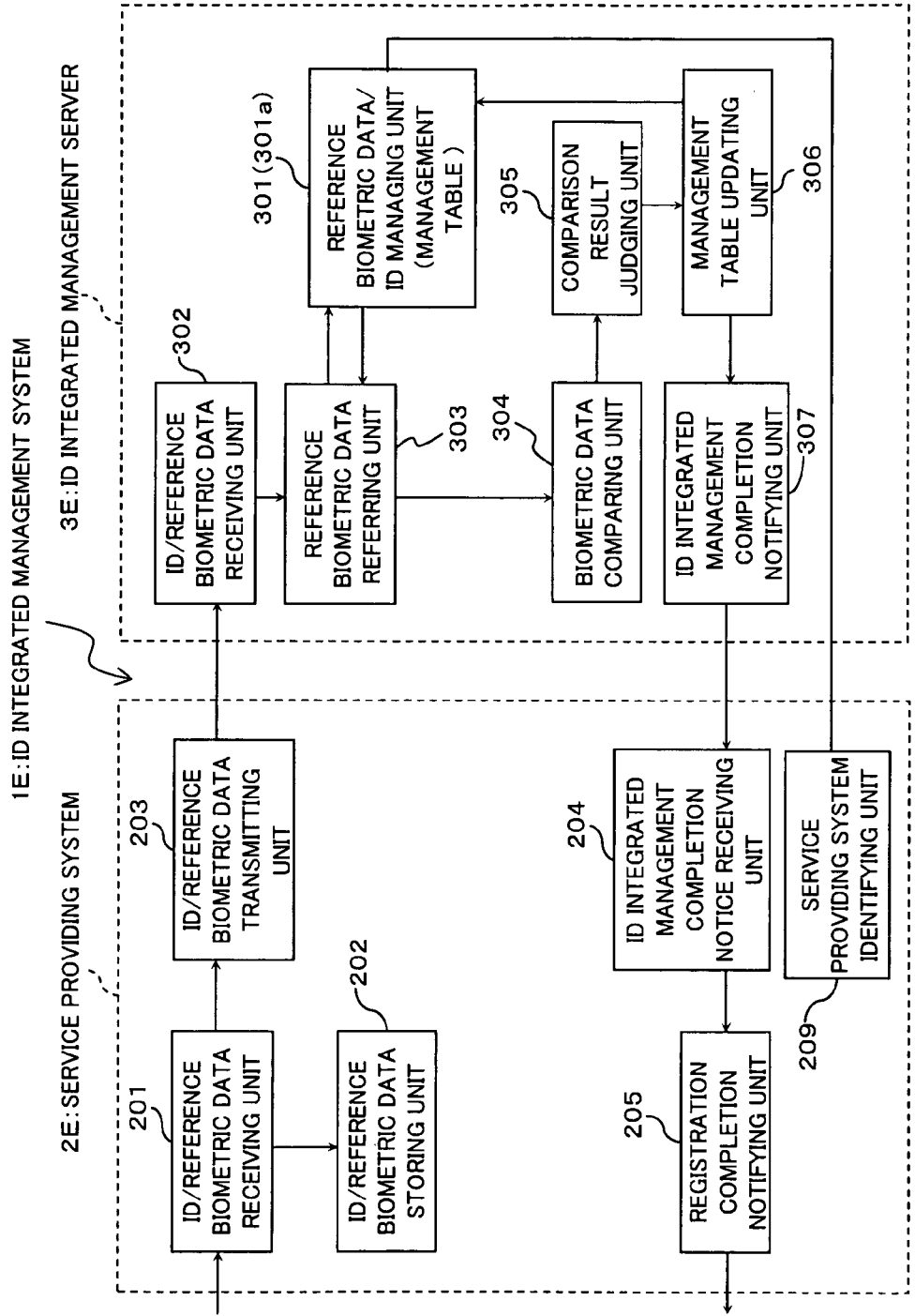
FIG. 7 is a block diagram showing a configuration of a fifth variation of the identification information integrated management system (registration processing system of the service providing system and the identification information integrated management server) as one embodiment.

FIG. 7 is a block diagram showing a configuration of a fifth variation of the identification information integrated management system (registration processing system of the service providing system and the identification information integrated management server) as one embodiment, and FIG. 8 is a view showing a configuration example of the management table in the ID integrated management server shown in FIG. 7. Meanwhile, in FIG. 7, the reference numeral identical to the already mentioned reference numeral indicates the identical portion or the substantially identical portion, so that the description thereof is not given.

As shown in FIG. 7, an identification information integrated management system (ID integrated management system) 1E of the fifth variation is composed of a plurality of service providing systems (service providing servers) 2E and one identification information integrated management server (ID integrated management server; management server) 3E. Meanwhile, in FIG. 7 also, although only one service providing system 2E is shown, two or more systems 2E are actually provided.

Although each service providing system 2E has a configuration similar to that of each service providing system 2 shown in FIG. 1, in the registration processing system of each service providing system 2E, a service providing system identifying unit 209 is further added in addition to the receiving unit 201, the storing unit 202, the transmitting unit 203, the receiving unit 204, and the registration completion notifying unit 205, which are similar to those of each service providing system 2 shown in FIG. 1.

Since the ID integrated management server 3E has a configuration similar to that of the ID integrated management server 3 shown in FIG. 1, the detailed description thereof is not given. However, in the reference biometric data/ID managing unit (storing unit) 301 in the ID integrated management server 3E of the fifth variation, the management table 301b shown in FIG. 8, for example, is used in place of the management table 301a shown in FIG. 1.

Herein, in the management table 301b used in the fifth variation also, as shown in FIG. 8, the record to which the management number (management No.) is given is created in the registration order and for each registration target reference biometric data, as in the case of the management table 301a shown in FIG. 2. Each record is composed of the field for storing the reference biometric data and a plurality of ID storing field for storing the ID (registration target ID) associated with the reference biometric data.

Then, in the management table 301b used in the fifth variation, a plurality of ID storing fields in each record are configured to store the IDs for different service providing systems A, B, C, D, E, etc. That is to say, in the management table (storing unit) 301b, a plurality of fields in which the registered IDs associated with each of a plurality of service providing systems 2E are registered and stored are set in one record associated with the registered reference biometric data.

Meanwhile, in the management table 301b shown in FIG. 8, five records to which the management Nos. 000001 to 000005 are given are shown. Then, in one record to which the management No. 000001 is given, for example, five different IDs "ikegami01", "j_ikegami", "980116", "00980116", and "ikegami" are registered and stored in five ID storing fields associated with the five service providing systems A, B, C, D, and E.

The service providing system identifying unit 209 added to each service providing system 2E notifies the ID integrated management server 3E of the identification information (system ID) for specifying each service providing system 2E belonging to this system 1E. By the system ID notified by the service providing system identifying unit 209, the ID integrated management server 3E may specify which of the service providing systems A, B, C, D, E, etc., shown in FIG. 8, for example, the service providing system 2E that has requested the user registration through the transmitting unit 203 is.

Then, the updating unit 306 in the ID integrated management server 3E of the fifth variation registers and stores the registration target ID in the ID storing field associated with the service providing system 2E, which has transmitted the registration target ID, as the registered ID, in the management table 301b. That is to say, in the updating unit 306 and the management table 301b, the service providing system 2E (system 2E that has requested the user registration), which has transmitted the registration target ID, is specified based on the system ID notified by the service providing system identifying unit 209 of the system 2E. Then, the updating unit 306 stores the registration target ID in the ID storing field associated with the specified system 2E.

According to the registration process in the system 1E of the fifth variation, a method of registering in the management table 301b using the system ID is adopted, and the registered ID and the service providing system 2E using the ID are clearly associated with each other and collectively managed in the management table 301b. Meanwhile, a flow of the registration process other than to associate the registered ID with the service providing system 2E in the management table 301b is the same as the flow of the registration process described with reference to FIG. 1, so that the description thereof is not given.

In this manner, each ID storing field in the management table 301b in the ID integrated management server 3E is associated one-to-one with each of a plurality of service providing systems 2E, and it is possible to perform the ID integrated management while relating the registered ID to the service providing system 2E.

[2-7] One Embodiment of Verification Processing System

Figure 9:
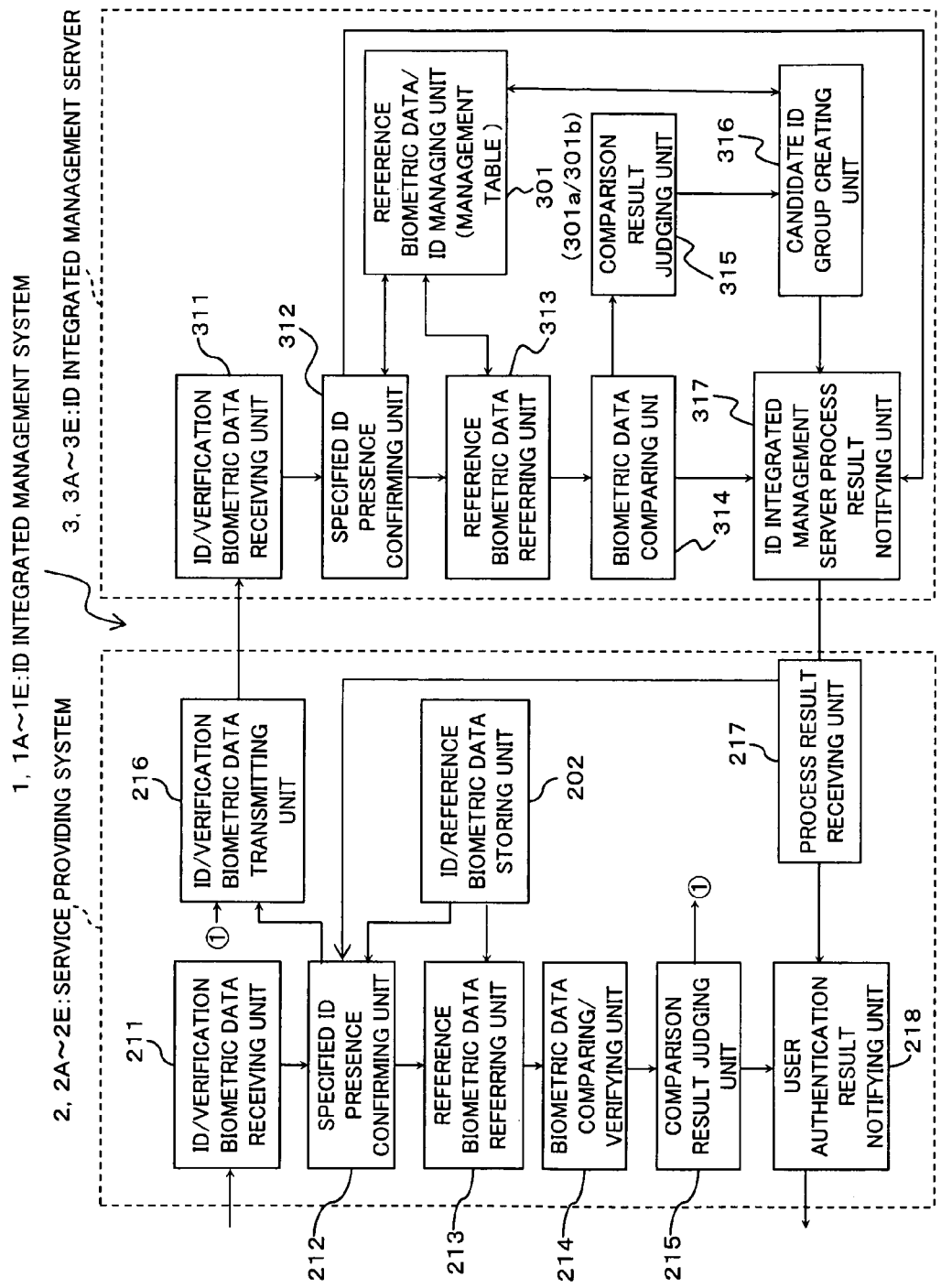
FIG. 9 is a block diagram showing a configuration of the identification information integrated management system (verification processing system of the service providing system and the identification information integrated management server) as one embodiment.

FIG. 9 is a block diagram showing a configuration of the identification information integrated management system (verification processing system of the service providing system and the identification integrated management server) as one embodiment.

The verification processing system shown in FIG. 9 is provided in the ID integrated management systems 1, 1A, 1B, 1C, 1D, and 1E described with reference to FIGS. 1 and 3 to 7. That is to say, the verification processing system shown in FIG. 9 is provided in the service providing systems 2, 2A, 2B, 2C, 2D, and 2E and the ID integrated management servers 3, 3A, 3B, 3C, 3D, and 3E provided with the registration processing system described with reference to FIGS. 1 and 3 to 7.

Meanwhile, in FIG. 9 also, although only one service providing systems 2, 2A, 2B, 2C, 2D, and 2E is shown, two or more systems are actually provided. Also, in the following description, for simplifying the description, reference numerals 1, 1A, 1B, 1C, 1D, and 1E of the ID integrated management system are represented by a reference numeral 1, reference numerals 2, 2A, 2B, 2C, 2D, and 2E indicating the service providing systems are represented by a reference numeral 2, and reference numerals 3, 3A, 3B, 3C, 3D, and 3E of the ID integrated management servers are represented by a reference numeral 3.

As shown in FIG. 9, the verification processing system of the service providing system 2 is provided with the storing unit 202 described above with reference to FIG. 1, and is provided with an ID/verification biometric data receiving unit 211, a specified ID presence confirming unit 212, a reference biometric data referring unit 213, a biometric data comparing/verifying unit 214, a comparison result judging unit 215, an ID/verification biometric data transmitting unit 216, a process result receiving unit 217, and a user authentication result notifying unit 218.

Also, as shown in FIG. 9, the verification processing system of the ID integrated management server 3 is provided with the managing unit 301 having the management table 301a described above with reference to FIGS. 1 and 2 or the management table 301b described above with reference to FIGS. 7 and 8.

Further, the verification processing system of the ID integrated management server 3 is provided with an ID/verification biometric data receiving unit 311, a specified ID presence confirming unit 312, a reference biometric data in management table referring unit 313, a biometric data comparing unit 314, a comparison result judging unit 315, a candidate ID group creating unit 316, and an ID integrated management server process result notifying unit 317 in addition to the managing unit 301.

The ID/verification biometric data receiving unit 211 receives the verification data from the user, when the user logs in to each service providing system 2 in order to receive the service provided by the relevant service providing system 2. The verification data includes the verification ID, which should be registered in the relevant service providing system 2, and predetermined verification biometric data (verification biometric information) obtained from the predetermined site of the living body of the user. Meanwhile, the receiving unit 211 may be used simultaneously with the receiving unit 201 shown in FIG. 1.

The specified ID presence confirming unit 212 searches in the storing unit 202 by the verification ID received by the receiving unit 211 to confirm whether or not the ID conforming to the relevant verification ID is registered in the storing unit 202. In addition, the specified ID presence confirming unit 212 also realizes the function as a searching unit to be described later.

When the presence of the ID conforming to the relevant verification ID is confirmed by the specified ID presence confirming unit 212, the reference biometric data referring unit 213 refers to the reference biometric data associated with the ID in the storing unit 202 and reads out the same from the storing unit 202.

The biometric data comparing/verifying unit 214 compares and verifies the reference biometric data read out by the referring unit 213 and the verification biometric information input by the user and received by the receiving unit 211. Also, the biometric data comparing/verifying unit 214 realizes the function as a third comparing unit to be described later.

When the reference biometric data conforms to the verification biometric data as a result of the comparison and verification by the comparing/verifying unit 213, the comparison result judging unit 215 judges that the user authentication is successful. Also, the comparison result judging unit 215 realizes the function as a third judging unit to be described later.

The user authentication result notifying unit 218 notifies the user of various kinds of information in addition to the user authentication result, and when the comparison result judging unit 215 judges that the user authentication is successful, the notifying unit 218 notifies the user of the success. Also, the user authentication result notifying unit 218 also realizes the function to notify the user of the judgment result by the function of the comparison result judging unit 215 as the third judging unit and the process result from the ID integrated management server 3, and the function as an ID notifying unit to be described later. Meanwhile, the notifying unit 218 may be used simultaneously with the notifying unit 205 shown in FIG. 1.

The ID/verification biometric data transmitting unit (verification information transmitting unit) 216 transmits the verification ID and the verification biometric data received by the receiving unit 211 to the ID integrated management server 3 in each of the following cases 1 and 2.

Meanwhile, the transmitting unit 216 may be used simultaneously with the transmitting unit 203.

Case 1: A case in which the verification ID is not registered in the relevant service providing system 2 (storing unit 202) when performing the user authentication by using the verification ID and the verification biometric data input by the user before starting to provide the predetermined service (when logging in to the service providing system 2). That is to say, a case in which, as a result of the specified ID presence confirming unit 212 searching in the storing unit 202 by the verification ID received by the receiving unit 211, it is confirmed that the ID conforming to the relevant verification ID is not registered in the storing unit 202. This case is considered to be the case in which the verification ID is not registered in the storing unit 202 because the user inputs the wrong ID or inputs the ID registered in another service providing system 2 by mistake.

Case 2: A case in which, as a result of the comparison and verification by the comparing/verifying unit 213, the reference biometric data does not conform to the verification biometric data, and the comparison result judging unit 215 judges that the user authentication is failed. This case is considered to be the case in which although the user inputs the wrong ID, the wrong ID registered in the storing unit 202 by chance. That is to say, this is the case in which the verification biometric data and the reference biometric data associated with the wrong ID are compared and verified to be judged to not conform to each other, and the user authentication fails.

The ID/verification biometric data receiving unit (verification information receiving unit) 311 receives the verification ID and the verification biometric information from each service providing system 2 (transmitting unit 216). Meanwhile, the receiving unit 311 may be used simultaneously with the receiving unit 302 shown in FIG. 1.

The specified ID presence confirming unit (confirming unit) 312 searches in the management table 301a (301b) by the verification ID received by the receiving unit 311 to confirm whether the ID conforming to the relevant verification ID is present in the management table 301a (301b).

When the specified ID presence confirming unit 312 confirms the presence of the ID conforming to the relevant verification ID, the reference biometric data referring unit 313 refers to one or more registered reference biometric data associated with the ID in the management table 301a (301b) and reads out the same from the management table 301a (301b). That is to say, the registered reference biometric data registered in the biometric data field (refer to FIGS. 2 and 8) in the record holding the ID is read out.

At that time, when the same ID is present in the ID storing fields in a plurality of different records, a plurality of registered reference biometric data in a plurality of different records are read out. Also, when the presence of the ID conforming to the relevant verification ID is not confirmed by the confirming unit 312, the confirming unit 312 notifies the notifying unit 317 to be described later of the absence. Meanwhile, the referring unit 313 may be used simultaneously with the referring unit 303 shown in FIG. 1.

The biometric data comparing unit (second comparing unit) 314 compares one or more registered reference biometric data read out from the management table 301a (301b) by the referring unit 313 with the verification biometric data received by the receiving unit 311. Meanwhile, the comparing unit 314 may be used simultaneously with the comparing unit 304 shown in FIG. 1.

The comparison result judging unit (second judging unit) 315 judges presence or absence of the registered reference biometric data conforming to the verification biometric data (whether the data is stored in the management table 301a (301b)) based on the comparison result by the comparing unit 314. Meanwhile, the judging unit 315 may be used simultaneously with the judging unit 305 shown in FIG. 1.

When the judging unit 315 judges that there is the registered reference biometric data conforming to the verification biometric data, the candidate ID group creating unit (list creating unit) 316 extracts one or more registered ID associated with the relevant registered reference biometric data in the management table 301a (301b) as a candidate ID to create a candidate ID list.

The ID integrated management server process result notifying unit (process result notifying unit) 317 notifies the service providing system 2 that has transmitted the verification ID and the verification biometric data of the candidate ID list (candidate ID group) created by the creating unit 316 as the process result. In addition, when the presence of the ID conforming to the verification ID is not confirmed by the confirming unit 312, the notifying unit 317 also realizes the function of notifying the service providing system 2 that has transmitted the verification ID and the verification biometric data that the authentication of the user has failed as the process result. Further, when the judging unit 315 judges that the registered reference biometric data conforming to the verification biometric data is not present, the notifying unit 317 also realizes the function of notifying the service providing system 2 that has transmitted the verification ID and the verification biometric data that the authentication of the user has failed as the process result. Meanwhile, the notifying unit 317 may be used simultaneously with the notifying unit 307 shown in FIG. 1.

The process result receiving unit 217 receives the process result from the ID integrated management server 3 (notifying unit 317). Meanwhile, the receiving unit 217 may be used simultaneously with the receiving unit 204 shown in FIG. 1.

After the receiving unit 217 receives the process result from the ID integrated management server 3 (notifying unit 317), the above-described specified ID presence confirming unit 212, the reference biometric data referring unit 213, the biometric data comparing/verifying unit 214, the comparison result judging unit 215, and the user authentication result notifying unit 218 realize the functions to be described below.

When the candidate ID list is included in the process result received by the receiving unit 217, the specified ID presence confirming unit 212 serves as the searching unit for searching for an ID conforming to the ID registered in the storing unit 202 from one or more candidate ID in the candidate ID list.

When the confirming unit 212 confirms the presence of the ID conforming to the registered ID in the storing unit 202 in the candidate ID, the reference biometric data referring unit 213 realizes the function of referring to the reference biometric data associated with the ID in the storing unit 202 and reading out the same from the storing unit 202.

The biometric data comparing/verifying unit 214 serves as the third comparing unit for comparing the reference biometric data read out by the referring unit 213 and the verification biometric data input by the user and received by the receiving unit 211.

When the reference biometric data and the verification biometric data conform to each other as a result of comparison by the comparing/verifying unit 214, the comparison result judging unit 215 serves as the third judging unit for judging that the authentication of the user is successful. On the other hand, the comparison result judging unit 215 serves as the third judging unit for judging that the authentication of the user has failed when the presence of the ID conforming to the registered ID in the storing unit 202 is not confirmed in the candidate ID by the confirming unit 212, or when the reference biometric data and the verification biometric data do not conform to each other as a result of comparison by the comparing/verifying unit 214.

Also, the user authentication result notifying unit 218 realizes the function of notifying the user of the judgment result (success/failure of the user authentication) by the judging unit 215, and when the process result received by the receiving unit 217 indicates that the authentication of the user has failed, of notifying the user of the failure.

Further, the user authentication result notifying unit 218 may serve as the ID notifying unit for notifying the user of the conformed ID searched and confirmed by the confirming unit 212 as the correct identification information of the user in the relevant service providing system 2 when the judging unit 215 judges that the authentication of the user is successful.

Next, operation of the verification process (verification processing system of the service providing system 2 and the ID integrated management server 3) of the ID integrated management system 1 of this embodiment configured as above is described.

In each service providing system 2, before starting to provide the predetermined service, the user authentication is performed by using the verification ID and the verification biometric data input by the user. More specifically, the user inputs the verification ID and the verification biometric data as the verification data when logging in to the service providing system 2, and each service providing system 2 starts to provide the service after performing the authentication of the user by using the verification data.

At that time, in each service providing system 2, when the verification data is received from the user (client) by the receiving unit 211, the confirming unit 212 confirms whether the ID specified by the user is the ID registered in the storing unit 202. When the presence of the ID is confirmed, the referring unit 213 reads out the reference biometric data associated with the ID from the storing unit 202, and the comparing/verifying unit 214 compares and verifies the reference biometric data and the verification biometric data.

When the reference biometric data conform to the verification biometric data as a result of comparison and verification by the comparing/verifying unit 214, the judging unit 215 judges that the authentication of the user is successful. When the user authentication is successful in this manner, the service providing system 2 starts to provide the predetermined service to the user and completes a series of verification processes.

On the other hand, hen the reference biometric data do not conform to the verification biometric data as a result of the comparison and verification by the comparing/verifying unit 214, the judging unit 215 judges that the authentication of the user is failed. When it is judged that the authentication is failed in this manner and when the confirming unit 212 judges that the verification ID is not registered in the storing unit 202, the user possibly specifies the wrong ID as described above. Then, in any case, the transmitting unit 216 transmits the verification data received from the user as it is to the ID integrated management server 3.

In the ID integrated management server 3, when the receiving unit 311 receives the verification data, the confirming unit 312 searches in all of the ID management fields (all of the ID storing fields) in all of the records of the management table 301a (301b), to confirm whether or not the ID conforming to the received verification ID is present in the management table 301a (301b).

When the presence of the ID is not confirmed by the confirming unit 312, the notifying unit 317 notifies the user of the user authentication failure through the notifying unit 218 of the service providing system 2, and the process ends.

When the confirming unit 312 confirms the presence of the ID, the referring unit 313 reads out the reference biometric data in one or more record holding the ID. Then, the comparing unit 314 compares and verifies the read-out reference biometric data and the verification biometric data passed from the service providing system 2. Based on the result of the comparison and verification, the judging unit 315 judges whether or not the reference biometric data conforming to the verification biometric data is stored in the management table 301a (301b).

When the judging unit 315 judges that the conforming reference biometric data is not stored, the notifying unit 317 notifies the user of the user authentication failure through the notifying unit 218 of the service providing system 2, and the process ends.

When the judging unit 315 judges that the conforming reference biometric data is stored, the candidate ID group creating unit 316 refers to the management table 301a (301b), and one or more ID associated with the reference biometric data is read out and listed as the candidate ID. The candidate ID list (candidate ID group) thus created is returned and notified from the notifying unit 317 to the service providing system 2 (presence result receiving unit 217) as the process result.

Upon reception of the process result including the above-described candidate ID list from the ID integrated management server 3 (notifying unit 317) by the process result receiving unit 217, the service providing system 2 operates as follows.

The confirming unit 212 searches in one or more candidate ID in the candidate ID list for the ID conforming to the ID registered in the storing unit 202 to confirm.

When the conforming ID is not present at all in the candidate ID list, it can be judged that the user logging in to this time is registered in another service providing system, but the user is not registered in the relevant service providing system 2. Therefore, it is not possible to start the service of the relevant service providing system 2, so that the user authentication failure is returned to the user through the notifying unit 218, and the process ends.

On the other hand, when the conforming ID is present in the candidate ID list, the referring unit 213 reads out the reference biometric data associated with the ID. Then, the reference biometric data and the verification biometric data input by the user are compared and verified by the comparing and verifying unit 214, and the judging unit 215 judges success/failure of the user authentication based on the result of the comparison and verification.

At that time, there is a case in which a plurality of IDs conforming to the ID in the candidate ID list are present in the storing unit 202. In such a case, the verification process of each of a plurality of reference biometric data associated with a plurality of IDs and the verification biometric data is performed.

When the verification biometric data is not verified to conform to any of a plurality of read-out reference biometric data, the judging unit 215 can judge that the ID conforming to the ID in the candidate ID list is present in the storing unit 202, but the ID is not that of the user himself/herself logging in this time. Therefore, in this case, the user authentication failure is notified to the user through the notifying unit 218, and the process ends.

On the other hand, when the verification biometric data is verified to conform to any one of a plurality of read-out reference biometric data, it can be recognized that the verification ID input by the user is different from the ID registered in this service providing system 2, but the user logging in this time is the user himself/herself.

Therefore, in this case, the judging unit 215 performs the authentication of the user with the user authentication success, and the service providing system 2 starts the predetermined service to the user and completes a series of processes. That is to say, even when the verification ID input by the user is not registered in the service providing system 2 (storing unit 202), the user is authenticated as himself/herself for the above-described cases. Thereby, even when the user inputs the ID registered in the different system by mistake while trying to log in to the target service providing system 2, the user authentication may be performed by surely specifying the correct ID by using the information managed in the management table 301a (301b).

At that time, when the management table 301b described with reference to FIGS. 7 and 8 is used in place of the management table 301a, as in the ID integrated management server 3E, the following effect can be obtained. In the management table 301b, the ID storing fields are set so as to be associated with each of a plurality of service providing systems 2E in each record. Therefore, even when the user inputs the wrong ID for each service providing system 2E, the correct ID for the associated service providing system 2E can be surely specified using the system ID in the ID integrated management server 3. That is to say, by the system ID (ID notified from the identifying unit 209) of the service providing system 2E to which the authentication process is requested, the ID registered in the management table 301b is determined. Thereby, when using the management table 301b, it is possible to specify a unique ID for the service providing system 2E to which the user tries to log in on the ID integrated management server 3E side, not to specify the unique ID on the service providing system 2 side by returning a plurality of IDs from the ID integrated management server 3 side as the candidate IDs.

Also, although the user inputs the ID registered in the different service providing system 2 by mistake while trying to log in to the target service providing system 2 in this system 1, when the correct ID is specified as above and the user authentication is successful, the predetermined service is started and the correct ID is notified to the user by the notifying unit 218. That is to say, in the service providing system 2, when the user inputs the wrong ID, the correct ID, which should be input originally, can be notified to the user at the same time as the predetermined service is started. Therefore, it becomes possible to allow the user to avoid to input the wrong ID next time.

Meanwhile, in the above-described service providing system 2, the process (service) that the user confirms the ID can be realized by notifying the user of the correct ID by the notifying unit 218 without starting the predetermined service when the user authentication is successful. Such a system can be used for the process only to confirm the ID when the user memorizes the ID registered in another service providing system 2 but forgets the ID for the target service providing system 2, for example. That is to say, when the user wants to confirm the correct ID while not aiming to receive the service to be provided, the user inputs the ID registered in another service providing system 2 and his/her own biometric data to the target service providing system 2 as the verification data. Thereby, the correct ID is specified and notified to the user as described above without starting the predetermined service, and the user can know the correct ID for the target service providing system 2.

[2-8] One example Applying Encoded Communication to this System

Figure 10:
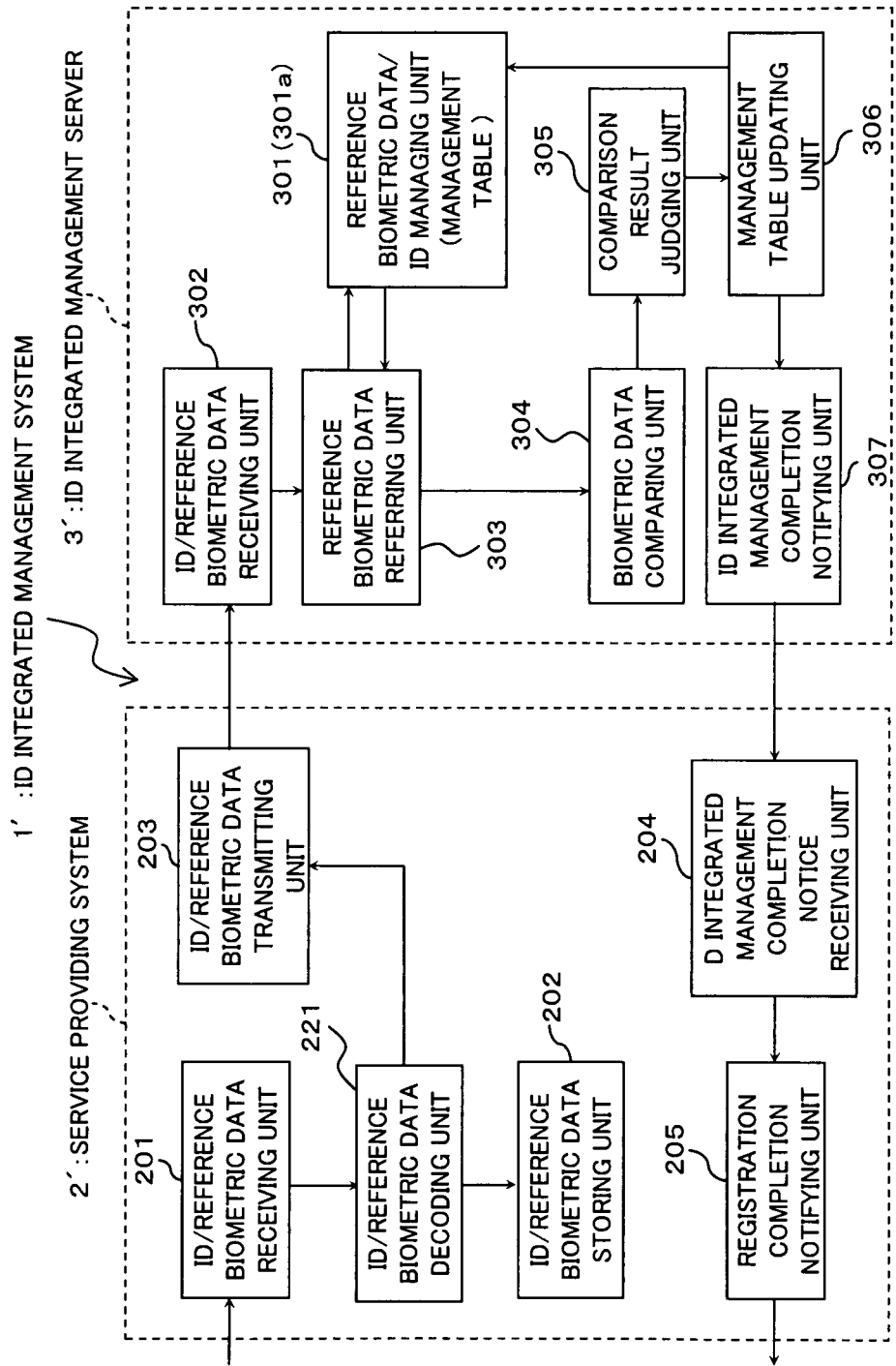
FIG. 10 is a block diagram showing a configuration of one example applying encoded communication to the identification information integrated management system (registration processing system of the service providing system and the identification information integrated management server) shown in FIG. 1.
Figure 11:
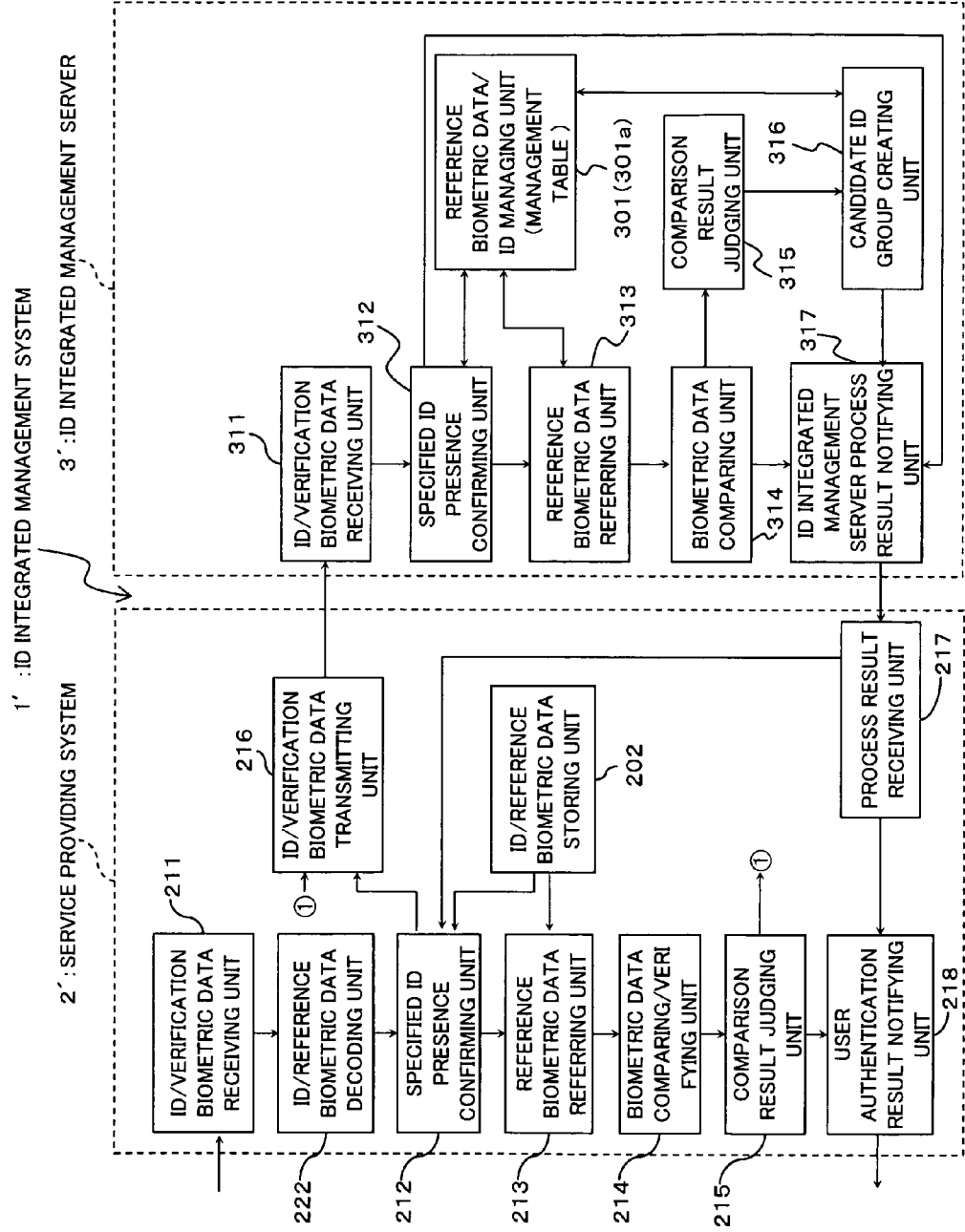
FIG. 11 is a block diagram showing a configuration of one example applying the encoded communication to the identification information integrated management system (verification processing system of the service providing system and the identification information integrated management server) shown in FIG. 9.

FIG. 10 is a block diagram showing a configuration of one example applying encoded communication to the ID integrated management system (registration processing system of the service providing system and the ID integrated management server) shown in FIG. 1, and FIG. 11 is a block diagram showing a configuration of one example applying the encoded communication to the ID integrated management system (registration processing system of the service providing system and the ID integrated management server) shown in FIG. 9. Meanwhile, in FIGS. 10 and 11, the reference numeral identical to the already mentioned reference numeral indicates the identical portion or the substantially identical portion, so that the description thereof is not given.

An identification information integrated management system (ID integrated management system) 1' shown in FIGS. 10 and 11 is composed of a plurality of service providing systems (service providing servers) 2' and one identification information integrated management server (ID integrated management server; management server) 3'. Meanwhile, although in FIG. 10 also, only one service providing system 2' is shown, two or more systems are actually provided.

The system 1' shown in FIGS. 10 and 11 is one example applying the encoded communication to the systems 1 and 1A to 1E described above with reference to FIGS. 1 to 9. In the system 1', it is assumed that the user inputs the ID and the biometric data used for the user authentication by encoding the same. That is to say, an object of the encoded communication applied to the system 1' is to prevent masquerading as the user by encoding the ID and the biometric data input by the user to the service providing system 2'.

Meanwhile, although the system 1' shown in FIG. 10 corresponds to the system 1 shown in FIG. 1, it goes without saying that the encoded communication described herein is similarly applied to the systems 1A to 1E shown in FIGS. 3 to 7.

The ID integrated management server 3' has a configuration similar to that of the ID integrated management server 3 shown in FIGS. 1 and 9, so that the description thereof is not given.

Although the registration processing system of each service providing system 2' has a configuration substantially similar to that of each service providing system 2 shown in FIG. 1, as shown in FIG. 10, in the registration processing system of each service providing system 2', an ID/reference biometric data decoding unit 221 is further added in addition to the receiving unit 201, the storing unit 202, the transmitting unit 203, the receiving unit 204, and the registration completion notifying unit 205 similar to those of each service providing system 2 shown in FIG. 1.

Also, although the verification processing system of each service providing system 2' has a configuration substantially similar to that of the verification processing system of each service providing system 2 shown in FIG. 9, as shown in FIG. 11, in the verification processing system of each service providing system 2', an ID/verification biometric data decoding unit 222 is further added in addition to the receiving unit 211, the confirming unit 212, the referring unit 213, the comparing/verifying unit 214, the judging unit 215, the transmitting unit 216, the receiving unit 217, and the notifying unit 218 similar to those of each service providing system 2 shown in FIG. 9.

The ID/reference biometric data decoding unit 221 decodes encoded registration data (encoded ID and encoded reference biometric data from the user) received by the receiving unit 201. Similarly, the ID/verification biometric data decoding unit 222 decodes encoded verification data (encoded ID and encoded verification biometric data from the user) received by the receiving unit 211. Meanwhile, the decoding units 221 and 222 may be commonly used. Also, the process after the decoding process by the decoding units 221 and 222 is similar to the process described above with reference to FIGS. 1 to 9, so that the description thereof is not given.

In this system 1', a series of process requests from the user (client) to the service providing system 2' are performed in a state in which the ID and the biometric data are encoded. Therefore, in the service providing system 2', at the time of user registration, the encoded data from the user is decoded by the decoding unit 221 and a series of registration processes are performed. Similarly, in the service providing system 2', when verifying the user at the time of login, the encoded data from the user is decoded by the decoding unit 222 and a series of verification processes are performed.

By performing such encoded communication, masquerading as the user may be prevented.

Meanwhile, because a configuration for encoding when transmitting the data from the user (client) is known, the description thereof is not given. Also, a data encoding scheme is not especially limited, and the known method may be used.

[2-9] Another Example Applying Encoded Communication to this System

Figure 12:
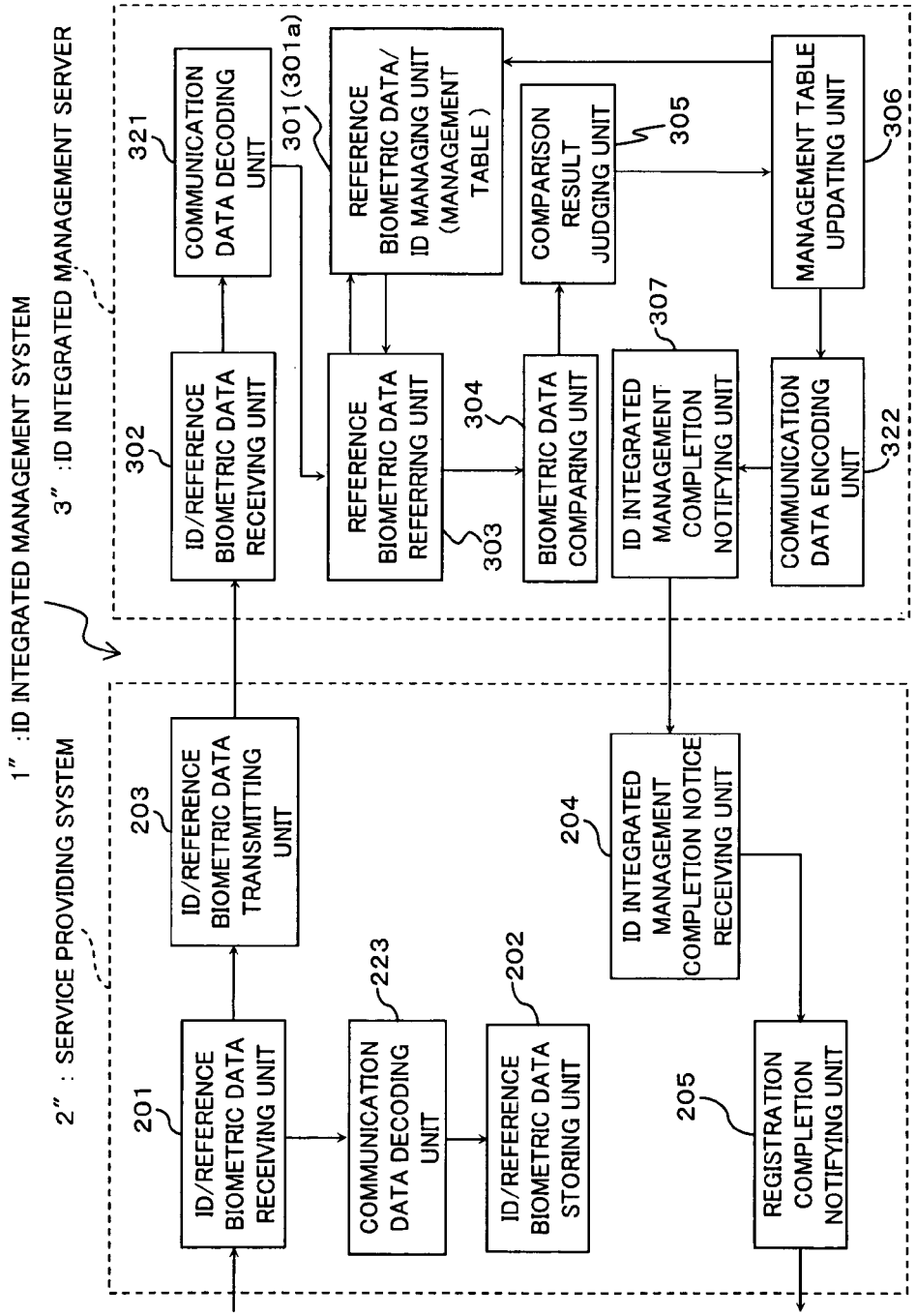
FIG. 12 is a block diagram showing a configuration of another example applying the encoded communication to the identification information integrated management system (registration processing system of the service providing system and the identification information integrated management server) shown in FIG. 1.
Figure 13:
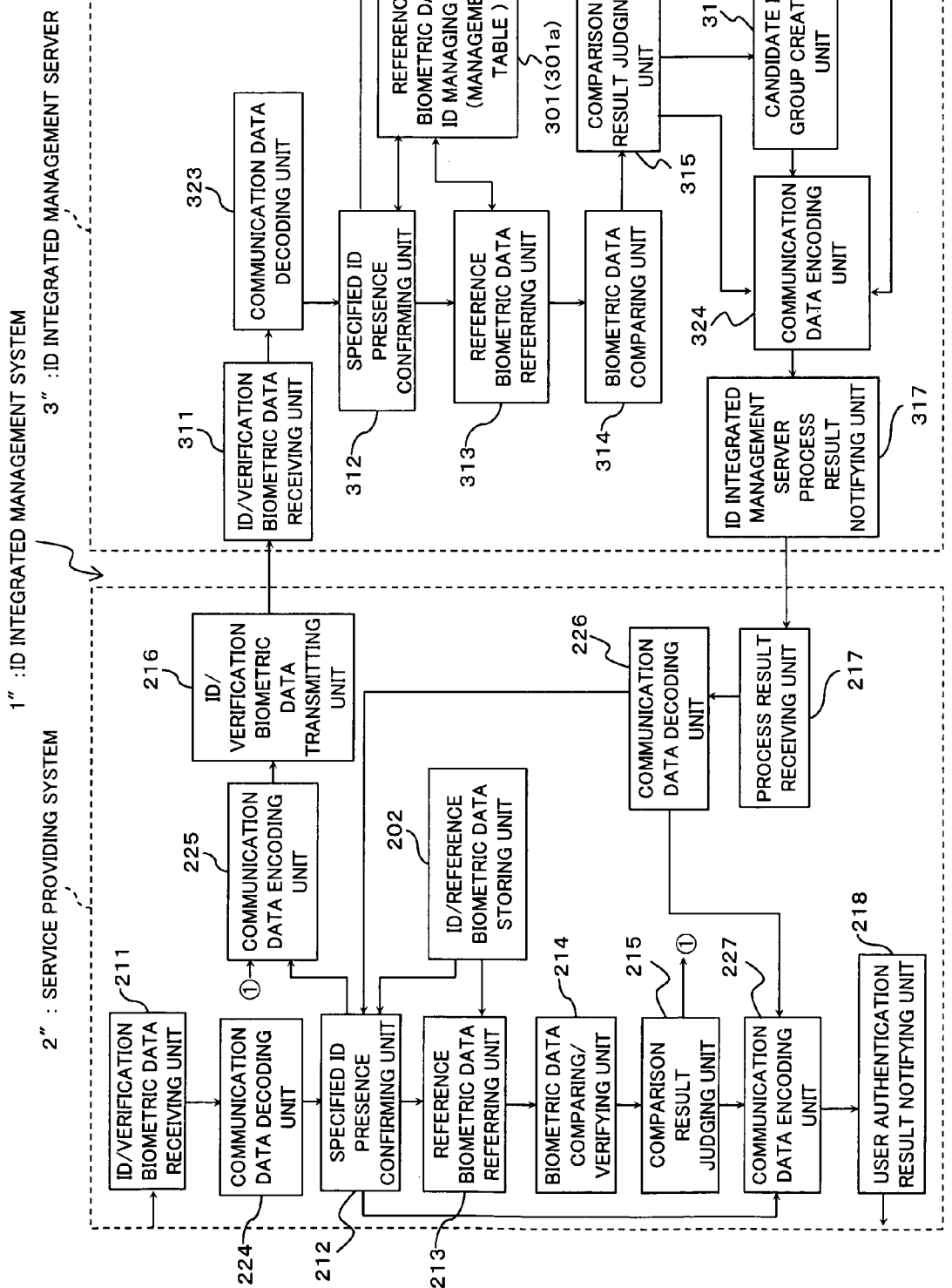
FIG. 13 is a block diagram showing a configuration of another example applying the encoded communication to the identification information integrated management system (verification processing system of the service providing system and the identification information integrated management server) shown in FIG. 9.

FIG. 12 is a block diagram showing a configuration of another example applying the encoded communication to the ID integrated management system (registration processing system of the service providing system and the ID integrated management server) shown in FIG. 1, and FIG. 13 is a block diagram showing a configuration of another example applying the encoded communication to the ID integrated management system (verification processing system of the service providing system and the ID integrated management server) shown in FIG. 9. Meanwhile, in FIGS. 12 and 13, the reference numeral identical to the already mentioned reference numeral indicates the identical portion or the substantially identical portion, so that the description thereof is not given.

An identification information integrated management system (ID integrated management system) 1" shown in FIGS. 12 and 13 is composed of a plurality of service providing systems (service providing servers) 2" and one identification information integrated management server (ID integrated management server; management server) 3". Meanwhile, in FIG. 12 also, although only one service providing system 2" is shown, two or more of the same are actually provided.

The system 1" shown in FIGS. 12 and 13 is another example applying the encoded communication to the systems 1 and 1A to 1E described above with reference to FIGS. 1 to 9. In the system 1", it is assumed that the user inputs the ID and the biometric data used for the user authentication by encoding them, and encodes the data communicated between the service providing system 2" and the ID integrated management server 3".

That is to say, an object of the encoded communication applied to the system 1" is to prevent masquerading as the user by encoding the ID and the biometric data input by the user to the service providing system 2". Also, and object of the encoded communication applied to the system 1" is to prevent alteration of the data by encoding the data between the service providing system 2" and the ID integrated management server 3".

Meanwhile, although the system 1" shown in FIG. 13 corresponds to the system 1 shown in FIG. 1, it goes without saying that the encoded communication herein described is similarly applied to the systems 1A to 1E shown in FIGS. 3 to 7, respectively.

Although the registration processing system of each service providing system 2" has a configuration substantially similar to that of the registration processing system of each service providing system 2 shown in FIG. 1, as shown FIG. 12, in the registration processing system of each service providing system 2", a communication data decoding unit 223 is further added in addition to the receiving unit 201, the storing unit 202, the transmitting unit 203, the receiving unit 204, and the registration completion notifying unit 205 similar to those of each service providing system 2 shown in FIG. 1.

Also, although the registration processing system of the ID integrated management server 3" has a configuration substantially similar to that of the registration processing system of the ID integrated management server 3 shown in FIG. 1, as shown in FIG. 12, in the registration processing system of the ID integrated management server 3", a communication data decoding unit 321 and a communication data encoding unit 322 are further added in addition to the managing unit 301, the receiving unit 302, the referring unit 303, the comparing unit 304, the judging unit 305, the updating unit 306, and the notifying unit 307 similar to those of the ID integrated management server 3 shown in FIG. 1.

On the other hand, although the verification processing system of each service providing system 2" has a configuration substantially similar to that of the verification processing system of each service providing system 2 shown in FIG. 9, as shown in FIG. 13, in the verification processing system of each service providing system 2", a communication data decoding unit 224, a communication data encoding unit 225, a communication data decoding unit 226, and a communication data encoding unit 227 are further added in addition to the receiving unit 211, the confirming unit 212, the referring unit 213, the comparing/verifying unit 214, the judging unit 215, the transmitting unit 216, the receiving unit 217, and the notifying unit 218 similar to those of each service providing system 2 shown in FIG. 9.

Also, although the verification processing system of the ID integrated management server 3" has a configuration substantially similar to that of the verification processing system of the ID integrated management server 3 shown in FIG. 9, as shown in FIG. 13, in the verification processing system of the ID integrated management server 3", a communication data decoding unit 323 and a communication data encoding unit 324 are further added in addition to the receiving unit 311, the confirming unit 312, the referring unit 313, the comparing unit 314, the judging unit 315, the creating unit 316, and the notifying unit 317 similar to those of the ID integrated management server 3 shown in FIG. 9.

The communication data decoding unit 223 decodes the encoded registration data (the encoded ID and the encoded reference biometric data from the user) received by the receiving unit 201. Similarly, the communication data decoding unit 224 decodes the encoded verification data (the encoded ID and the encoded verification biometric data from the user) received by the receiving unit 211. Also, the communication data decoding unit 226 decodes the encoded process result received by the receiving unit 217. Meanwhile, the decoding units 223, 224 and 226 may be commonly used.

The communication data encoding unit 225 encodes information (the verification ID and the verification biometric data), which should be transmitted to the ID integrated management server 3" by the transmitting unit 216. Also, the communication data encoding unit 227 encodes the information (such as authentication result), which should be notified to the user by the notifying unit 218. Meanwhile, the encoding units 225 and 227 may be commonly used.

The communication data decoding unit 321 decodes the encoded registration data received by the receiving unit 302 as the communication data decoding unit 223 does. Meanwhile, in each service providing system 2", the transmitting unit 203 directly transmits the encoded registration data received by the receiving unit 201. Also, the communication data encoding unit 322 encodes the information that should be notified to the service providing system 2" by the notifying unit 307. Meanwhile, in each service providing system 2", the encoded information from the ID integrated management server 3" is directly notified to the user through the receiving unit 204 and the notifying unit 205.

The communication data decoding unit 323 decodes the encoded verification data received by the receiving unit 311. Also, the communication data encoding unit 324 encodes the information that should be notified to the service providing system 2" by the notifying unit 317.

Meanwhile, the above-described communication data decoding units 321 and 323 may be commonly used, and the above-described communication data encoding units 322 and 324 may be commonly used. Also, the process other than the decoding process by the above-described decoding units 223, 224, 226, 321 and 323 and the encoding process by the above-described encoding units 225, 227, 322 and 324 is similar to the process described above with reference to FIGS. 1 to 9, so that the description thereof is not given.

In this system 1" also, a series of process requests from the user (client) to the service providing system 2" are performed in a state in which the ID and the biometric data are encoded as in the above-described system 1'. Therefore, in the service providing system 2", at the time of user registration, the encoded data from the user is decoded by the communication data decoding unit 223 and a series of registration processes are performed. Also, at the time of user registration, the encoded data from the user is directly transmitted from the service providing system 2" to the ID integrated management server 3", and in the ID integrated management server 3", the received encoded data is decoded by the communication data decoding unit 321 and a series of registration processes are performed. Further, the completion notice of the ID integrated management server 3" is encoded by the communication data encoding unit 322 and notified to the service providing system 2" by the notifying unit 307. Then, the encoded completion notice is directly notified to the user through the receiving unit 204 and the notifying unit 205 of the service providing system 2".

Similarly, in the service providing system 2", at the time of user verification in the login, the encoded data from the user is decoded by the communication data decoding unit 224 and a series of verification processes are performed. Also, the user authentication result according to the user verification is encoded by the communication data encoding unit 227 and notified to the user by the notifying unit 218. When transmitting the verification data from the service providing system 2" to the ID integrated management server 3" at the time of user verification, the verification data is encoded by the communication data encoding unit 225 and transmitted by the transmitting unit 216. In the ID integrated management server 3", the received encoded data is decoded by the communication data decoding unit 323 and a series of verification processes are performed. Further, the process result at the ID integrated management server 3" (sometimes including the candidate ID list) is encoded by the communication data encoding unit 324 and notified to the service providing system 2" by the notifying unit 317. Then, the encoded process result is received by the receiving unit 217 of the service providing system 2" and decoded by the communication data decoding unit 226, and then a series of processes are performed.

By performing such encoded communication, masquerading as the user can be prevented, and the data communicated between the service providing system 2" and the ID integrated management server 3" can be encoded, so that alteration of the data may be prevented.

Meanwhile, since the configuration of encoding when transmitting the data from the user (client) is known, the description thereof is not given. Also, the data encoding scheme is not especially limited, and any known method can be used. Further, as the encoding scheme by the communication data decoding units 223, 224, 226, 321 and 323 and the communication data encoding units 225, 227, 322 and 324, the same scheme may be adopted, or different schemes may be adopted. Also, although the same encoding scheme may be adopted to the communication between the ID integrated management server 3" and a plurality of service providing systems 2", it is also possible to use different encoding schemes for each system 2". When using the different encoding schemes in this manner, it becomes possible to make breaking by an eavesdropper or the like further difficult to ensure security of the communication data.

[3] Registration Procedure and Verification Procedure

The following specific example may describe a case in which the fingerprint is adopted as the biometric data and fingerprint authentication is performed, the present invention is not limited to the fingerprint. It goes without saying that the process similar to that of the present application is possible to obtain the effect similar to that of the present application, by adopting the technique according to the present application even in the system using the authentication technique by the biometric data other than the fingerprint (such as a palm print, vein information, iris, a vocal print).

[3-1] First Example

Figure 14:
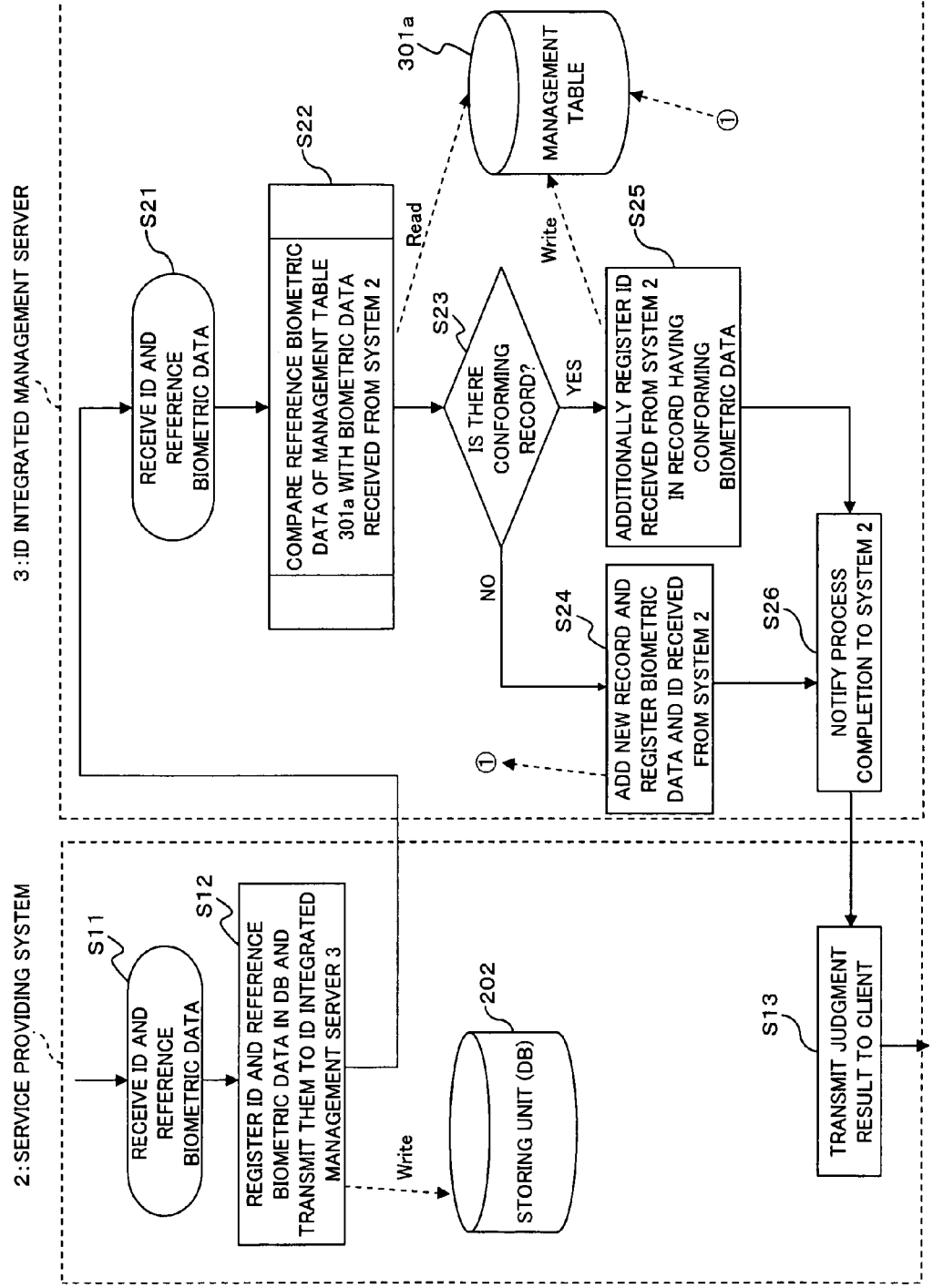
FIG. 14 is a flowchart for illustrating registration procedure by the identification information integrated management system (registration processing system of the service providing system and the identification information integrated management server) shown in FIG. 1.
Figure 15:
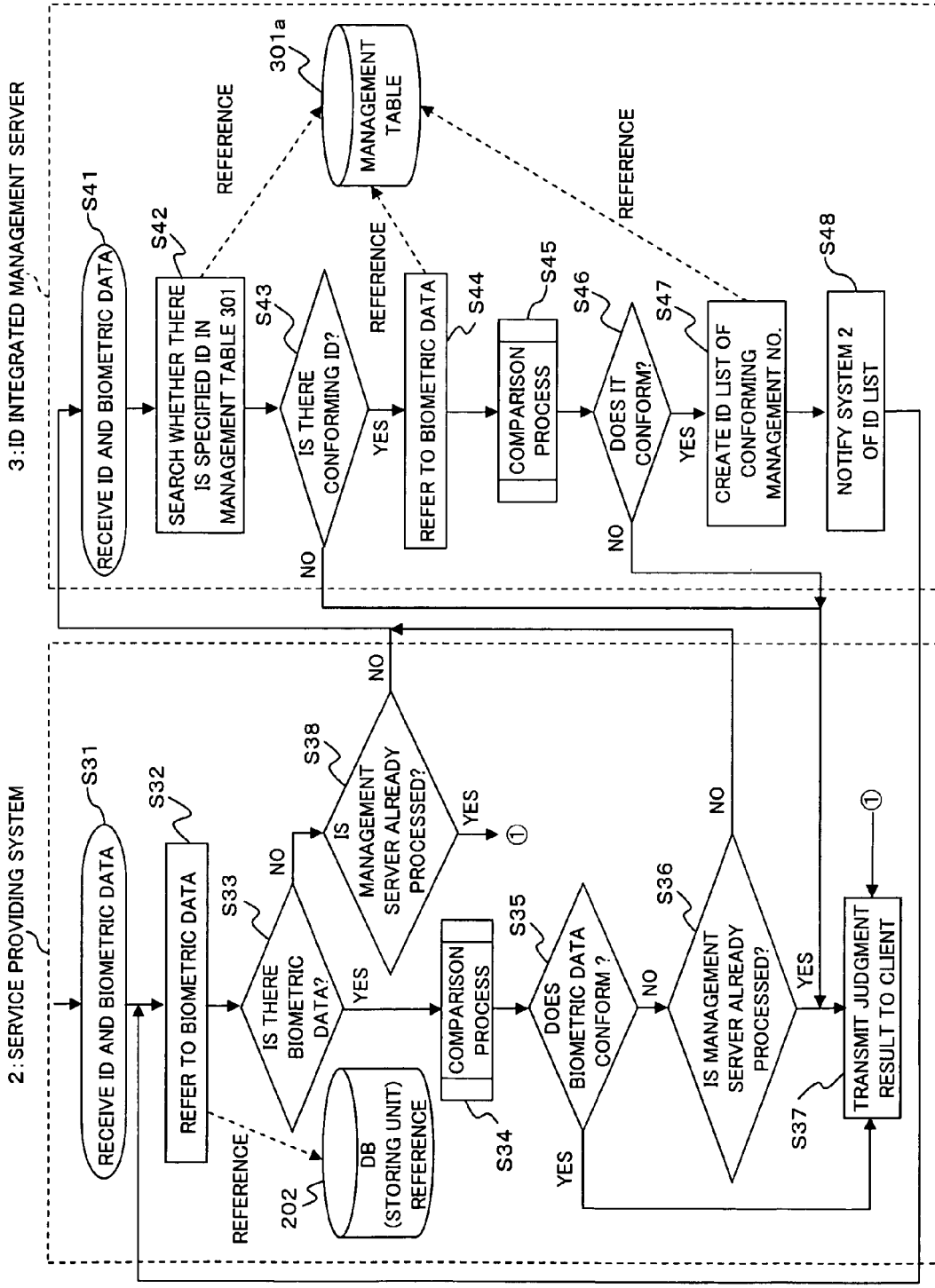
FIG. 15 is a flowchart for illustrating verification procedure by the identification information integrated management system (verification processing system of the service providing system and the identification information integrated management server) shown in FIG. 9.

FIG. 14 is a flowchart for illustrating the registration procedure by the ID integrated management system (registration processing system of the service providing system and the ID integrated management server) shown in FIG. 1, and FIG. 15 is a flowchart for illustrating the verification procedure by the ID integrated management system (verification processing system of the service providing system and the ID integrated management server) shown in FIG. 9.

A first example of the registration procedure and the verification procedure described herein relates to the ID integrated management system 1 shown in FIGS. 1 and 9, for example.

In the first example, it is assumed that there are a plurality of service providing systems 2 for performing the user authentication by the biometric authentication to provide the service, in an environment used by the user. In such an environment, the ID registered by the user is dynamically managed by the ID integrated management server 3. Thereby, even when the same user who sets different IDs for each service providing system 2 specifies the login ID for another service providing system B by mistake when logging in to the service providing system A, for example, it is possible to specify the correct ID and succeeds in the user authentication. A specific example thereof is described hereinafter.

First, at the time of registration in the service providing system 2, the user registers and stores the ID and the reference biometric data in the database (DB; storing unit 202) in the service providing system 2 and in the management table 301a of the ID integrated management server 3. A flow of the registration procedure at that time is described according to the flowchart (steps S11 to S13 and S21 to S26) shown in FIG. 14.

The user registers the ID and the reference biometric data used at the time of login in order to use the service providing system 2. At that time, the same ID registration by different users is not allowed in one service providing system 2, so that when the ID is redundantly registered, the user is warned to set another ID. Since this warning process is known, the description thereof is not given.

In this manner, the service providing system 2 starts the registration process on the assumption that the ID is not redundantly registered in the service providing system 2. Upon reception of the ID and the reference biometric data, which are the registration target, from the user are received by the receiving unit 202 (step S11), the service providing system 2 registers the ID and the reference biometric data in its own database 202 and transmits them to the ID integrated management server 3 by the transmitting unit 203 (step S12).

Upon reception of the ID and the reference biometric data from the service providing system 2 by the receiving unit 302 (step S21), the ID integrated management server 3 compares and verifies the received reference biometric data and the biometric data stored in the reference biometric data field of the management table 301a (refer to FIG. 2) by the referring unit 303 and the comparing unit 304 (step S22).

Herein, when the judging unit 305 judges that the data does not conform to the reference biometric data of any record (No route from step S23), the user is not registered any of a plurality of service providing systems. Therefore, the updating unit 306 adds a new record to the management table 301a and registers the received reference biometric data and ID in the record (step S24).

For example, in the management table 301a shown in FIG. 2, it is assumed that the user transmits the ID "takayama" and the reference biometric data in a state in which a record to which the management No. 000005 is given is not yet created. In addition, it is assumed that the reference biometric data does not conform to any biometric data in the records having the management Nos. 000001 to 000004. In this case, the updating unit 306 newly adds the record having the management No. 000005 to register the received reference biometric data in the reference biometric data field of the relevant record and register the ID "takayama" in the ID management field (1) of the relevant record.

Also, when the judging unit 305 judges that the data conforms to the biometric data stored in the reference biometric data field (YES route from step S23), it can be judged that the user is already registered to any of a plurality of service providing systems 2. Therefore, the updating unit 306 additionally registers the ID specified by the user in the record having the conforming biometric data (step S25).

For example, in the management table 301a shown in FIG. 2, it is assumed that the user transmits the ID "ikegami" and the reference biometric data in a state in which the ID is not stored yet in an ID management field (5) of the management No. 000001. Then, it is assumed that the reference biometric data conforms to the biometric data of the management No. 000001. In this case, the updating unit 306 registers the ID "ikegami" specified by the user in the ID management field (5). Of course, it goes without saying that, when the ID specified by the user is already registered in an ID management field (n) of the corresponding record, it is not necessary to add the new field, so that no process is required.

In this manner, the ID integrated management server 3 (updating unit 306) updates the management table 301a, and notifies the service providing system 2 of the process completion by the notifying unit 307 (step S26).

Then, upon reception of the process completion notice from the ID integrated management server 3 by the receiving unit 204, the service providing system 2 notifies the user (client) of the registration process completion by the notifying unit 205 (step S13).

Next, a flow of the verification procedure when the user logs in to the service providing system 2 in the environment in which the ID integrated management server 3 performs the ID integrated management by using the management table 301a as described above is described according to the flowchart (steps S31 to S38 and S41 to S48) shown in FIG. 15.

In each service providing system 2, when the receiving unit 211 receives the verification data from the user (client) (step S31), the confirming unit 212 confirms whether the ID specified by the user is the ID registered in the storing unit 202. When the presence of the ID is confirmed, the referring unit 213 reads out the reference biometric data associated with the ID from the storing unit 202 (step S32; YES route from step S33), and the comparing/verifying unit 214 compares and verifies the reference biometric data and the verification biometric data (step S34).

Meanwhile, when the presence of the received ID and the presence of the biometric data associated with the ID are not confirmed at the step S33 (NO route from step S33), it is judged whether the verification ID is already processed by the ID integrated management server 3 (step S38). If the data is not processed yet (NO route from step S38), the transmitting unit 216 transmits the verification data to the ID integrated management server 3 as described below. If the data is already processed (YES route from step S38), the notifying unit 218 notifies the user of the user authentication failure (step S37).

When the reference biometric data and the verification biometric data conform to each other as a result of the comparison and verification by the comparing/verifying unit 214 (YES route from step S35), the judging unit 215 judges that the authentication of the user is successful. Then, the notifying unit 218 notifies the user that the user authentication is successful (step S37).

On the other hand, when the reference biometric data and the verification biometric data do not conform to each other as a result of comparison and verification by the comparing/verifying unit 214 (NO route from step S35), it is judged whether the verification data is already processed by the ID integrated management server 3 (step S36). If the data is not processed yet (NO route from step S36), the transmitting unit 216 transmits the verification data to the ID integrated management server 3 as described later. If the data is already processed (YES route from step S36), the notifying unit 218 notifies user of the user authentication failure (step S37).

In the ID integrated management server 3, when the receiving unit 311 receives the verification data (step S41), the confirming unit 312 searches in all of the ID management fields (all of the ID storing fields) in all of the records of the management table 301a (301b), and it is confirmed whether the ID conforming to the received verification ID is present in the management table 301a (301b) (step S42). When the presence of the ID is not confirmed by the confirming unit 312 (NO route from step S43), the notifying unit 317 notifies the user of the user authentication failure through the notifying unit 218 of the service providing system 2 (step S37).

When the confirming unit 312 confirms the presence of the ID (YES route from step S43), the referring unit 313 reads out the reference biometric data in one or more record holding the ID (step S44). Then, the comparing unit 314 compares and verifies the read-out reference biometric data and the verification biometric data passed from the service providing system 2 (step S45). Based on the result of this comparison and verification, the judging unit 315 judges whether the reference biometric data conforming to the verification biometric data is stored in the management table 301a (301b) (step S46). When the judging unit 315 judges that the conforming reference biometric data is not stored (NO route from step S46), the notifying unit 317 notifies the user of the user authentication failure through the notifying unit 218 of the service providing system 2 (step S37).

When the judging unit 315 judges that the conforming reference biometric data is stored (YES route from step S46), the candidate ID group creating unit 316 refers to the management table 301a (301b) and one or more ID associated with the relevant reference biometric data is read out and listed as the candidate ID (step S47). The candidate ID list (candidate ID group) thus created is returned and notified from the notifying unit 317 to the service providing system 2 (process result receiving unit 217) as the process result (step S48).

Upon reception of the process result containing the above-described candidate ID list from the ID integrated management server 3 (notifying unit 317) by the process result receiving unit 217, the service providing system 2 operates as follows. That is to say, the confirming unit 212 searches in one or more candidate ID in the candidate ID list for the ID conforming to the ID registered in the storing unit 202 to confirm (step S32). When there is no conforming ID in the candidate ID list (NO route from step S33 and YES route from step S38), the notifying unit 218 notifies the user of the user authentication failure (step S37).

On the other hand, when there is the conforming ID in the candidate ID list (YES route from step S33), the referring unit 213 reads out the reference biometric data associated with the ID. Then, the comparing/verifying unit 214 compares and verifies the reference biometric data and the verification biometric data input by the user (step S34), and the judging unit 215 judges whether the user authentication is successful or failed based on the result of the comparison and verification (step S35).

If the verification biometric data is not verified to conform to any of a plurality of read-out reference biometric data (NO route from step S35 and YES route from step S36), the notifying unit 218 notifies the user of the user authentication failure (step S37).

On the other hand, when the verification biometric data is verified to conform to any one of a plurality of read-out reference biometric data (YES route from step S35), although the verification ID input by the user is different from the ID registered in this service providing system 2, it is possible to authenticate the user logging in to this time as himself/herself, so that the notifying unit 218 notifies the user of the authentication (step S37).

Although a series of verification procedures are described with reference to FIG. 15 thus far, next, especially, the process to authenticate the user as himself/herself by specifying the correct ID by using the information managed by the ID integrated management server 3, when the user inputs the wrong ID while trying to logging in to the service providing system 2 is specifically described.

Meanwhile, the inputting error by the user in this application is not intended to mean the inputting error in the broad sense of the term. The inputting error by the user in this application is intended to mean a case in which, since the user registration is performed with different IDs in a plurality of service providing systems 2, the user inputs the ID for a different service providing system 2 by mistake while he/she should input the ID for the service providing system 2 from which he/she wants to receive the service.

Hereinafter, for simplifying the description, the service providing system 2 to which the user logs into in order to receive the service is referred to as a "service providing system A". Also, an original service providing system 2 in which the ID, which the user inputs to the "service providing system A" by mistake, is registered is referred to as a "service providing system B".

Further, in the specific process description hereinafter, a registration example of the management table 301a shown in FIG. 2 is used. That is to say, it is assumed that the user logging in to the service providing system A is the user conforming to the biometric data of the management No. 000001. Also, it is assumed that the user registers "ikegami01" stored in the ID management field (1) as the ID in the service providing system A, and registers "j_ikegami" stored in the ID management field (2) in the service providing system B. In addition, in the following description, assume a case in which the user who tries to use the service providing system A inputs "j_ikegami" registered in the service providing system B by mistake while he/she should originally input "ikegami01" as the ID.

The user extracts the verification biometric data for logging in to the service providing system A and inputs the verification ID to access the service providing system A. The service providing system A examines whether the ID conforming to the ID received by the receiving unit 211 (that is to say, "j_ikegami" is registered in its own DB 202 as the user by the confirming unit 211 (steps S31 and S32).

Herein, there might be another user who registers the same ID ("j_ikegami") in DB 202. Even if the ID conforming to the relevant ID input by mistake is present in the DB 202, the ID is not that of the relevant user but that of anyone else who uses the ID in advance. Therefore, even when the same ID is present in the DB 202, the reference biometric data associated with the ID is not that of the relevant user, so that the reference biometric data and the verification biometric data of the relevant user is not verified to conform to each other.

At that point in time, however, the service providing system A cannot judge whether the user inputs the wrong ID or the user is not registered in the service providing system A. Therefore, the received verification ID and verification biometric data are transmitted to the ID integrated management server 3 and the verification process is shifted to the ID integrated management server 3 (YES route from step S33, step S34, NO route from step S35, and NO route from step S38).

In addition, in a case in which the received ID itself is not registered in the service providing system A also, it is not possible to judge whether the user inputs the wrong ID or the user is not registered in the service providing system A. Therefore, the received verification ID and verification biometric data are transmitted to the ID integrated management server 3 and the verification process is shifted to the ID integrated management server 3 (NO route from step S33 and NO route from step S38).

Next, in the ID integrated management server 3 to which the process is shifted in this manner, all of the ID management fields are searched in the management table 301a and it is confirmed whether or not the ID conforming to the received ID is managed in the management table 301a (steps S41 and S42). Herein, when the conforming ID is not present (NO route from step S43), the verification process is shifted to the service providing system A as no conforming data, and the service providing system A terminates the process with the user authentication failure.

In this specific example, however "j_ikegami" is present in the ID management field (2) of the record to which the management No. 000001 is given. Therefore, the ID integrated management server 3 compares and verifies the reference biometric data of this record and the verification biometric data received from the service providing system A, and it is judged to be the same user (YES route from step S43, steps S44 and S45, and YES route from step S46).

When the results of the comparison and verification conform to each other (YES route from step S46), all of the IDs (that is to say, five IDs of ikegami01/j_ikegami/980116/00980116/ikegami) of the record (that is to say, the record having the management No. 000001) are listed (step S47). Then, the ID group is notified as the candidate ID list to the service providing system A (step S48). Of course, it is already definite that "j_ikegami" does not conform, so that "j_ikegami" may be excluded at this point in time.

The service providing system A to which the ID group (candidate ID list) is returned searches its own DB 202 for the ID, which is present in the ID group (step S32). Herein, "ikegami01", which is formally registered in the DB 202, is found (NO route from step S33).

However, since the service providing system A receives the ID group from the ID integrated management server 3, a plurality of IDs in the ID group might conform to a plurality of IDs registered in the DB 202. Therefore, there is a case in which one of a plurality of IDs must be specified, so that the service providing system A compares and verifies the reference biometric data associated with all of the conforming IDs and the verification biometric data (step S34). As a result, in this specific example, the verification biometric data conforms to the reference biometric data associated with "ikegami01" (YES route from step S35). Thereby, even when the user inputs "j_ikegami", which is the login ID for the service providing system B, by mistake while he/she should originally input "ikegami01", while trying to logging in to the service providing system A, it is possible to surely specify the correct ID to authenticate the user as himself/herself.

[3-2] Second Example

Figure 16:
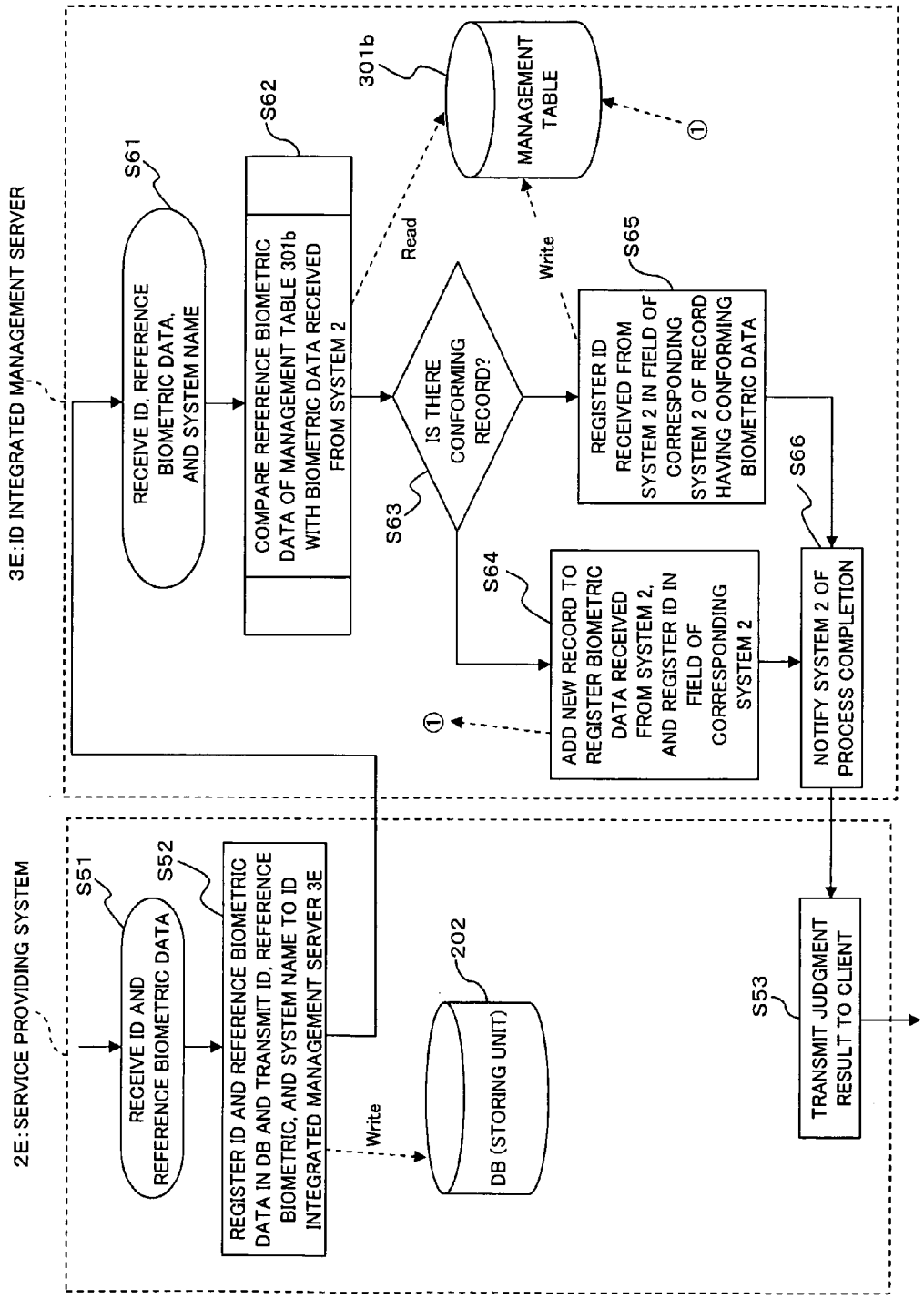
FIG. 16 is a flowchart for illustrating registration procedure by the identification information integrated management system (registration processing system of the service providing system and the identification information integrated management server) shown in FIG. 7.
Figure 17:
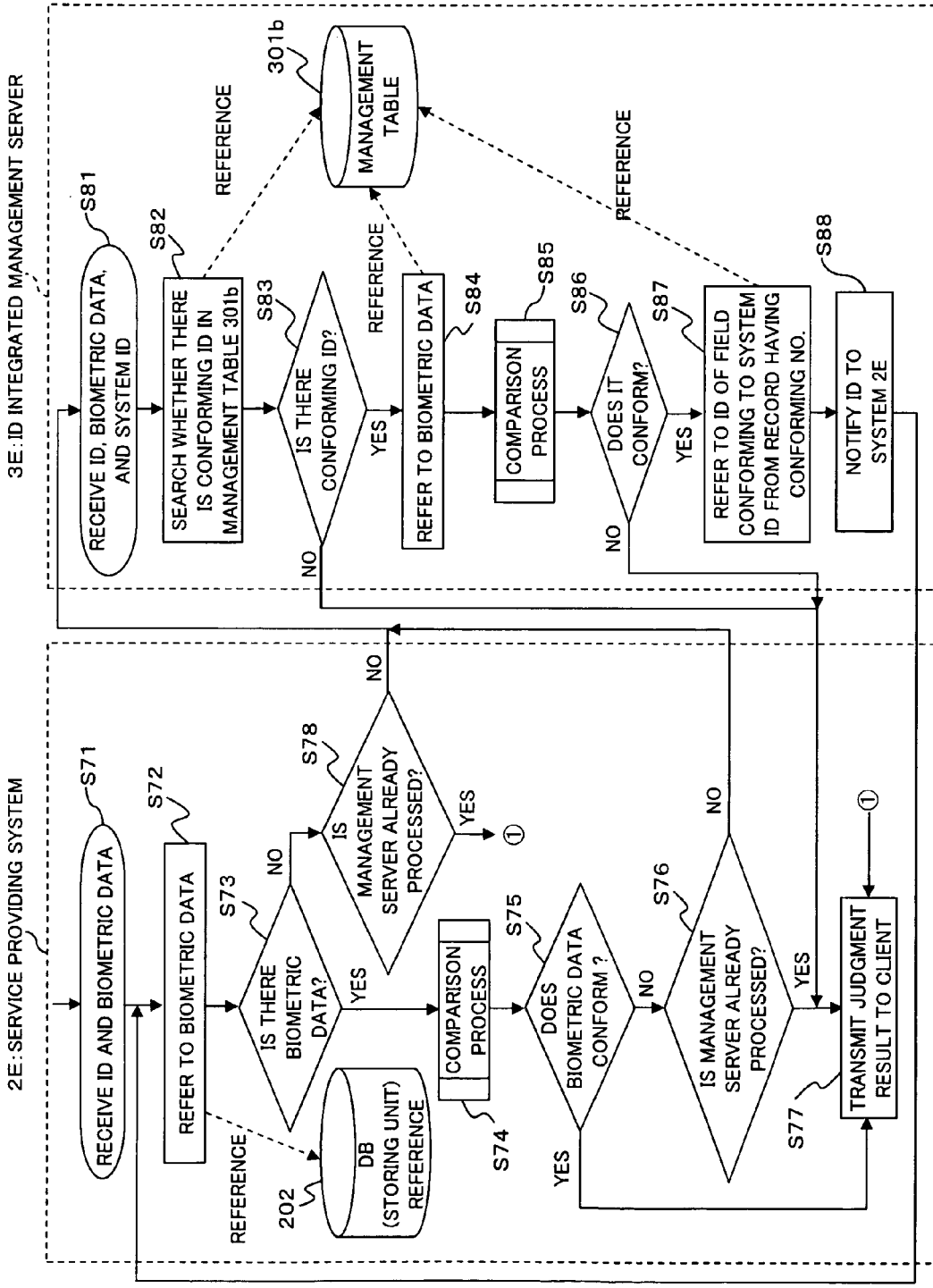
FIG. 17 is a flowchart for illustrating verification procedure by the identification information integrated management system (verification processing system of the service providing system and the identification information integrated management server) shown in FIG. 9, performed by using the management table shown in FIG. 8 registered by the procedure shown in FIG. 16.

FIG. 16 is a flow chart for illustrating the registration procedure by the identification information integrated management system (registration processing system of the service providing system and the identification information integrated management server) shown in FIG. 7, and FIG. 17 is a flowchart for illustrating the verification procedure by the identification information integrated management system (verification processing system of the service providing system and the identification information integrated management server) shown in FIG. 9 performed by using the management table shown in FIG. 8 registered with the procedure shown in FIG. 16.

The second example of the registration procedure and the verification process procedure herein described relates to the ID integrated management system 1E shown in FIGS. 7 and 9, for example.

In the second example also, it is assumed that there are a plurality of service providing systems 2E for providing the service by performing the user authentication by the biometric authentication in the environment used by the user. In such an environment, the ID registered by the user is dynamically managed by the ID integrated management server 3E as in the case of the above-described first example. In the management table 301a of the above-described first example, the ID and each service providing system 2 are not associated with each other, but the ID registered in the service providing system 2 is associated with the reference biometric data, and the ID is managed by successively adding the ID management field. On the other hand, in the ID management table 301b in the second example, the ID storing field and the service providing system 2E are associated with each other one-to-one based on the system ID from the identifying unit 209. Thereby, even when the login ID for another service providing system B is specified by mistake when logging in to the service providing system A, for example, a correct unique ID can be specified on the ID integrated management server 3E side. Hereinafter, the specific example thereof is described.

Each service providing system 2E and the ID integrated management server 3E (management table 301b) may be associated by automatic process, of course, or manually associated by a system manager. A detailed description of associating means is not given. In this embodiment, as described above with reference to FIG. 7, the ID storing field in the management table 301b of the ID integrated management server 3E is specified by the system ID from the identifying unit 209. At that time, in the management table 301b, as shown in FIG. 8, each ID management field and each service providing system 2E are associated one-to-one with each other.

In a state in which the ID integrated management server 3E and the service providing system 2E are associated with each other in this manner, the flow of the registration procedure is first described with reference to the flowchart (steps S51 to S53 and S61 to S66) shown in FIG. 16.

The user registers the ID and the reference biometric data used at the time of login in order to use the service providing system 2E, as in the case of the first example. In the second example also, the service providing system 2E starts the registration process on the assumption that the ID is not redundantly registered in the service providing system 2E. When the service providing system 2 receives the ID and the reference biometric data, which are the registration target from the user, by the receiving unit 202 (step S51), the system registers the ID and the reference biometric data in its own database 202 and transmits them to the ID integrated management server 3E by the transmitting unit 203 (step S52). At that time, the service providing system 2E of the second example transmits the system ID (herein, a system name or the like) specifying the relevant service providing system 2E to the ID integrated management server 3E together with the ID and the reference biometric data (step S52). The system ID is notified by the identifying unit 209 to the ID integrated management server 3E as described above.

In the ID integrated management server 3E, when the receiving unit 302 receives the ID, the reference biometric data, and the system name from the service providing system 2 (step S61), the referring unit 303 and the comparing unit 304 compare and verify the received reference biometric data and the biometric data stored in the reference biometric data field of the management table 301a (refer to FIG. 2) (step S62).

Herein, when the judging unit 305 judges that the data does not conform to the reference biometric data of any of the records (NO route from step S63), the user is not registered yet in any of a plurality of service providing systems. Therefore, the updating unit 306 adds a new record to the management table 301b and registers the received reference biometric data in the biometric field in the record, and registers the received ID in the ID storing field specified by the system name (step S64).

Also, when the judging unit 305 judges that the data conforms to the biometric data stored in the reference biometric data field (YES route from step S63), it can be judge that the user is registered in any of a plurality of service providing system 2E. Therefore, the updating unit 306 additionally registers the ID specified by the user in the ID storing field specified by the system name in the record having the conforming biometric data (step S65).

In this manner, the ID integrated management server 3E (updating unit 306) updates the management table 301b, and notifies the service providing system 2E of the process completion notification by the notifying unit 307 (step S66).

Then, upon the reception of the process completion notice from the ID integrated management server 3E by the receiving unit 204, the service providing system 2E notifies the user (client) of the registration process completion by the notifying unit 205 (step S53).

Next, a flow of the verification procedure when the user logs in to the service providing system 2E in an environment in which the ID integrated management is performed by associating the ID storing field of the management table 301b with each service providing system 2E one-to-one as described above is described with reference to the flowchart (steps S71 to S78 and S81 to S88) shown in FIG. 17. Meanwhile, the processes at steps S71 to S78 and S82 to S86 correspond to the processes at the steps S31 to S38 and S42 to S46 in FIG. 15, respectively, so that the detailed description thereof is not given.

Especially, herein, the process to authenticate the user as himself/herself by specifying the correct ID by using the information managed by the ID integrated management server 3E when the user inputs the wrong ID while trying to log in to the service providing system 2E is specifically described.

Hereinafter, for simplifying the description, the service providing system 2E, to which the user logs in, in order to receive the service, is referred to as the "service providing system A". Also, the service providing system 2E in which the ID, which the user inputs to the "service providing system A" by mistake, is originally registered is referred to as the "service providing system B".

Further, in the specific process description below, the registration example of the management table 301b shown in FIG. 8 is used. That is to say, it is assumed that the user who logs in to the service providing system A is the user conforming to the biometric data of the management No. 000001. In addition, it is assumed that the user registers "ikegami01" stored in the ID storing field for the service providing system A in the service providing system A as the ID, and registers "j_ikegami" stored in the ID storing field for the service providing system B to the service providing system B. Then, in the following description, assume a case in which the user who tries to use the service providing system A inputs "j_ikegami" registered in the service providing system B by mistake while he/she should originally input "ikegami01" as the ID.

In a series of verification procedures at that time, the verification process procedure (steps S71 to S78) in which the service providing system A receives the user authentication request from the user and requests the process to the ID integrated management server 3E is similar to the procedure (steps S31 to S38) of the above-described first example, so that the description thereof is not given.

In the second example, the ID integrated management server 3E receives the identification information (system name as the system ID) capable of being judged to be the process request from the service providing system A together with the ID "j_ikegami" and the verification biometric data (step S81). Subsequent search process (steps S82 and S83) of the management table 301b by the ID integrated management server 3E and the reference/comparison verification process (steps S84 to S86) of the biometric data are similar to the procedure (steps S42 to S46) of the above-described first example, so that the description thereof is not given. However, there is no meaning in searching in the ID storing field of the service providing system A at the time of search process at the step S82 corresponding to the process request from the service providing system A, so that the ID storing field may be excluded from the search target.

In this manner, the reference biometric data of the record having the management No. 000001 in which the ID "j_ikegami" is present and the verification biometric data are compared and verified as in the case of the first example (step S85). When it is confirmed that the data are conform to each other (YES route from step S86), the ID storing field of the service providing system A is referred to in the record (that is to say, the record having the management No. 000001) holding this reference biometric data (step S87). Then, the ID stored in this ID storing field (that is to say, "ikegami01") is transmitted to the service providing system A (step S88).

The service providing system A to which the unique ID is returned from the ID integrated management server 3E confirms whether or not the returned ID is present in its own DB 202 (steps S71 to S73). As a result of confirming process, "ikegami01" formally registered in the DB 202 is found.

At that point in time, since the unique ID is found, the service providing system A may authenticate the relevant user as himself/herself. However, in the ID integrated management server 3E (management table 301b), the same ID might be found in a plurality of records. In FIG. 8, for example, the same ID "ikegami" is present in the record having the management No. 000001 and the record having the management No. 000004. Therefore, there is a case in which the verification process in the ID integrated management server 3E becomes 1:N verification. It goes without saying that in the biometric authentication technique, 1:N verification process might cause false acceptance. Therefore, in the service providing system A, even when the unique ID is returned, the reference biometric data associated with the relevant ID in its own DB 202 and the verification biometric data received from the user are compared and verified (steps S72 to S75), thereby the user may be more surely specified.

In this manner, according to the second example, the verification biometric data conforms to the reference biometric data associated with the ID "ikegami01" (YES route from step S75). Thereby, even when the user inputs "j_ikegami", which is the login ID for the service providing system B, by mistake while he/she should originally input "ikegami01", while logging in to the service providing system A, the correct ID is surely specified and the user may be authenticated as himself/herself.

[4] Effect of this Embodiment

As described above, according to this technique, when the IDs registered in a plurality of service providing systems 2 for the same user do not conform to each other, the ID integrated management server 3 performs the ID integrated management by the reference biometric data of the user. Thereby, it becomes possible to perform the authentication of the user even when the user inputs the wrong ID, while maintaining security and without increase in cost and burden on the user.

That is to say, with this technique, in the environment in which there are a plurality of service providing systems 2 using the biometric verification, the user authentication is possible even when the ID for another system 2 is input by mistake when logging in to the target system 2, due to the different IDs for each system 2. At that time, in the ID integrated management server 3, based on the management table 301a, when the biometric authentication is successful, the candidate ID list is created. Then, in the target system 2, by finding the ID for the target system 2 from the candidate ID list, and by comparing and verifying the reference biometric data associated with the found ID and the verification biometric data, the correct ID is surely specified to authenticate the user as himself/herself.

Also, in the ID integrated management server 3E, based on the management table 301b, when the unique ID is specified (refer to the above-described second example), the user can be more surely specified by comparing and verifying the reference biometric data associated with the unique ID and the verification biometric data in the target system 2E.

[5] Others

Meanwhile, the present invention is not limited to the above-described embodiments, and may be implemented with various modifications without departing from the spirit of the present invention.

For example, although various comparison and verification methods of the biometric data are already suggested, the present application does not limit a type of the site of the living body from which the biometric is taken and the processing method of a verification engine for performing the verification process, and it goes without saying that any biometric authentication method may be used.

Also, (all of or a part of) the functions as the above-described units 201 to 209, 211 to 218, 221 to 227, 301 to 309, 311 to 317 and 321 to 324 are realized by a computer (including CPU, information processor, various terminals) executing a predetermined application program (identification information integrated management program).

Herein, the computer is a concept including hardware and an operating system (OS), and is intended to mean the hardware operating under the control of the OS. Also, when the OS is not required and the application program independently operates the hardware, the hardware itself corresponds to the computer. The hardware is provided with at least a microprocessor such as a CPU, and means for reading the computer program recorded in the recording medium. The above-described program includes a program code for allowing the above-described computer to realize the function as the units 201 to 209, 211 to 218, 221 to 227, 301 to 309, 311 to 317 and 321 to 324. In addition, a part of the functions may be realized not by the application program but by the OS.

All the examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the gist and scope of the invention

What is claimed is:

1. An identification information integrated management system, the system comprising:
   a plurality of service providing systems for starting to provide a predetermined service for a user after performing authentication of the user by using an identification information piece and a reference biometric information piece of the user, the reference biometric information piece of the user being registered in the plurality of service providing systems while being associated with a plurality of different identification information pieces, each of the plurality of service providing systems including a first storage registering and storing a identification information piece and a biometric information piece registered by the user; and
   a management server for performing integrated management of the plurality of different identification information pieces and the reference biometric information piece used for the authentication in the plurality of service providing systems, wherein
   the management server includes:
   a second storage registering and storing the reference biometric information piece as a registered reference biometric information piece and the plurality of different identification information pieces as registered identification information pieces in association with each other, each of the different identification information pieces being used in each of the service providing systems; and
   a first processor,
   wherein the first processor executes a process including:
   obtaining the identification information piece and the reference biometric information piece registered by the user in each of the service providing systems from each of the service providing systems as a registration target identification information piece and a registration target reference biometric information piece, respectively;
   first comparing the registration target reference biometric information piece obtained with the registered reference biometric information piece having been stored in the second storage;

first judging presence or absence of the registered reference biometric information piece conforming to the registration target reference biometric information piece, based on a comparison result by the first comparing; and
first updating information pieces in the second storage in order to store the registration target identification information piece and the registration target reference biometric information piece in the second storage as the registered identification information pieces and the registered reference biometric information piece, respectively, when the first judging judges that the registered reference biometric information piece conforming to the registration target reference biometric information piece is not present, wherein
each of the service providing systems authenticates the user when a verification biometric information piece corresponding to a verification identification information piece input by the user is registered as the biometric information piece in the first storage and the biometric information piece in the first storage matches the verification biometric information input by the user, and further includes a verification information transmitter for transmitting the verification biometric information piece input by the user to the management server, when the biometric information piece corresponding to the verification identification information piece is not registered in the first storage at the time of user authentication by using the verification identification information piece and the verification biometric information piece input by the user before starting to provide the predetermined service, and
the first processor in the management server further executes a process including:
receiving the verification identification information piece and the verification biometric information piece from each of the service providing systems;
confirming whether or not an identification information piece conforming to the verification identification information piece received is present in the second storage;
second comparing, when the confirming confirms presence of the identification information piece conforming to the verification identification information piece, one or more registered reference biometric information pieces associated with the identification information piece in the second storage with the verification biometric information piece received;
second judging presence or absence of a registered reference biometric information piece conforming to the verification biometric information piece, based on a comparison result by the second comparing;
creating a candidate identification information list by extracting, when the second judging judges that the registered reference biometric information piece conforming to the verification biometric information piece is present, one or more registered identification information pieces associated with the registered reference biometric information piece in the second storage as one or more candidate identification information pieces to create a candidate identification information list; and
notifying the candidate identification information list created by the creating to the service providing system, which has transmitted the verification identification information piece and the verification biometric information piece, as a process result.

2. The identification information integrated management system according to claim 1, wherein each of the service providing systems includes a registration target information transmitter for transmitting the identification information piece and the reference biometric information piece to the management server as the registration target identification information piece and the registration target reference biometric information piece, respectively, when registering the identification information piece and the reference biometric information piece of the user, and the first processor further executes a process including receiving, upon the obtaining, the registration target identification information piece and the registration target reference biometric information piece from each of the service providing systems.

3. The identification information integrated management system according to claim 2, wherein each of the service providing systems further includes a monitor for monitoring registration request of the identification information piece and the reference biometric information piece by the user to the service providing system, and upon detection of reception of the registration request, the monitor allows the registration target information transmitter to transmit the identification information piece and the reference biometric information piece to the management server as the registration target identification information piece and the registration target reference biometric information piece, respectively.

4. The identification information integrated management system according to claim 2, wherein the first processor in the management server further executes a process including notifying the service providing system in which the user has registered the identification information piece and the reference biometric information piece of an update result of the second storage by the first updating, and each of the service providing systems further includes:
an update result receiver for receiving the update result from the management server; and
a second processor,
wherein the second processor executes a process including judging success or failure of the update result received by the update result receiver, and in a case of failure, allowing the registration target information transmitter to transmit again the registration target identification information piece and the registration target reference biometric information piece of which updating is failed to the management server.

5. The identification information integrated management system according to claim 2, wherein the second processor in each of the service providing systems further executes a process including second updating the reference biometric information piece in the service providing system after registering the reference biometric information piece of the user, and when the user updates the reference biometric information piece by the second updating, the registration target information transmitter transmits the reference biometric information piece to the management server; and in the management server, the first comparing compares the reference biometric information piece received with the registered reference biometric information piece having been stored in the second storage, and the first judging judges presence or absence of the registered reference biometric information piece conforming to the reference biometric information piece, based on the comparison result by the first comparing; and when the first judging judges that the registered reference biometric information piece conforming to the reference biometric information piece is present, the first updating updates the information pieces in the second storage so as to replace the registered reference biometric information piece by the reference biometric information piece.

6. The identification information integrated management system according to claim 1, wherein
the management server further includes a user registration monitor for monitoring registration status of the identification information piece and the reference biometric information piece by the user in each of the service providing systems, and
when the user registration monitor detects the update of the identification information piece and the reference biometric information piece of the user, the obtaining obtains an updated identification information piece and an updated reference biometric information piece as the registration target identification information piece and the registration target reference biometric information piece, respectively.

7. The identification information integrated management system according to claim 1, wherein when the first judging judges that the registered reference biometric information piece conforming to the registration target reference biometric information piece is present, the first updating updates the information pieces in the second storage so as to store the registration target identification information piece in the second storage as the registered identification information pieces associated with the registered reference biometric information piece.

8. The identification information integrated management system according to claim 7, wherein when the registration target identification information piece is not yet registered as the registered identification information pieces for the registered reference biometric information piece in the second storage, the first updating updates the information pieces in the second storage so as to store the registration target identification information piece in the second storage as the registered identification information pieces associated with the registered reference biometric information piece.

9. The identification information integrated management system according to claim 1, wherein
in the second storage, a plurality of fields, in which the registered identification information pieces associated with each of the service providing systems are registered and stored, are set in one record corresponding to the registered reference biometric information piece, and
the first updating registers and stores the registration target identification information piece as the registered identification information pieces in the field associated with the service providing system transmitting the registration target identification information piece.

10. The identification information integrated management system according to claim 7, wherein the first updating updates the information pieces in the second storage so as to replace the registered reference biometric information piece by the registration target reference biometric information piece obtained by the obtaining, when updating the information pieces in the second storage.

11. The identification information integrated management system according to claim 1, wherein the second processor in each of the service providing systems further executes a process including notifying the user of registration completion at the time of registration completion of the identification information piece and the reference biometric information piece of the user in the service providing system.

12. The identification information integrated management system according to claim 1, wherein when the confirming does not confirm the presence of the identification information piece conforming to the verification identification information piece, the first processor notifies the service providing system, which has transmitted the verification identification information piece and the verification biometric information piece, that the authentication of the user is failed as the process result.

13. The identification information integrated management system according to claim 1, wherein
the second processor in each of the service providing systems further executes a process including:
receiving the process result from the management server;
searching, when the candidate identification information list is included in the process result received, for an identification information piece conforming to identification information pieces registered in the service providing system in the one or more candidate identification information pieces in the candidate identification information list;
third comparing, when the searching has found the identification information piece conforming to one of the one or more candidate identification information pieces, reference biometric information piece associated with the conforming identification information piece with the verification biometric information piece input by the user; and
third judging that the authentication of the user is successful when the reference biometric information piece conforms to the verification biometric information piece as a result of the comparison by the third comparing, and on the other hand, judging that the authentication of the user is failed when the searching does not find the identification information piece conforming to one of the one or more candidate identification information pieces, or when the reference biometric information piece does not conform to the verification biometric information piece as a result of the comparison by the third comparing.

14. The identification information integrated management system according to claim 13, wherein the second processor in each of the service providing systems further executes a process including notifying the user of conforming identification information piece found by the searching as correct identification information piece of the user in the service providing system, when the third judging judges that the authentication of the user is successful.

15. An identification information integrated management server for performing integrated management of an identification information piece and a reference biometric information piece used for authentication of a user in a plurality of service providing systems for starting to provide a predetermined service for the user after performing the authentication of the user by using the identification information piece and the reference biometric information piece of the user, the reference biometric information piece of the user being registered in the plurality of service providing systems while being associated with different identification information pieces, each of the plurality of service providing systems including a first storage registering and storing a identification information piece and a biometric information piece registered by the user, each of the service providing systems authenticating the user when a verification biometric information piece corresponding to a verification identification information piece input by the user is registered as the biometric information piece in the first storage and the biometric information piece in the first storage matches the verification biometric information input by the user, the server comprising:
- a second storage registering and storing the reference biometric information piece as a registered reference biometric information piece and the plurality of different identification information pieces as registered identification information pieces in association with each other, each of the different identification information pieces being used in each of the service providing systems; and
- a processor,
- wherein the processor executes a process including:
  - obtaining the identification information piece and the reference biometric information piece registered in each of the service providing systems by the user from each of the service providing systems as a registration target identification information piece and a registration target reference biometric information piece, respectively;
  - first comparing the registration target reference biometric information piece obtained with the registered reference biometric information piece having been stored in the second storage;
  - first judging presence or absence of the registered reference biometric information piece conforming to the registration target reference biometric information piece based on a comparison result by the first comparing;
  - updating information pieces in the second storage so as to store the registration target identification information piece and the registration target reference biometric information piece in the second storage as the registered identification information piece and the registered reference biometric information piece, respectively, when the first judging judges that the registered reference biometric information piece conforming to the registration target reference biometric information piece is not present;
  - receiving the verification biometric information piece input by the user and transmitted from each of the service providing systems, when the biometric information piece corresponding to the verification identification information piece is not registered in the first storage at the time of user authentication by using the verification identification information piece and the verification biometric information piece input by the user before starting to provide the predetermined service;
  - confirming whether or not an identification information piece conforming to the verification identification information piece received is present in the second storage;
  - second comparing, when presence of the identification information piece conforming to the verification identification information piece is confirmed by the confirming, one or more registered reference biometric information pieces associated with the identification information piece in the second storage with the verification biometric information piece received;
  - second judging presence or absence of a registered reference biometric information piece conforming to the verification biometric information piece, based on a comparison result by the second comparing;
  - creating a candidate identification information list by extracting, when the second judging judges that the registered reference biometric information piece conforming to the verification biometric information piece is present, one or more registered identification information pieces associated with the registered reference biometric information piece in the second storage as one or more candidate identification information pieces to create a candidate identification information list; and
  - notifying the service providing system, which has transmitted the verification identification information piece and the verification biometric information piece, of the candidate identification information list created by the creating as a process result.

16. A non-transitory computer readable recording medium having recorded therein an identification information integrated management program to allow a computer to serve as an identification information integrated management server for performing integrated management of an identification information piece and a reference biometric information piece used for authentication of a user in a plurality of service providing systems for starting to provide a predetermined service for the user after performing the authentication of the user by using the identification information piece and the reference biometric information piece of the user, the reference biometric information piece of the user being registered in the plurality of service providing systems while being associated with different identification information pieces, each of the plurality of service providing systems including a first storage registering and storing a identification information piece and a biometric information piece registered by the user, each of the service providing systems authenticating the user when a verification biometric information piece corresponding to a verification identification information piece input by the user is registered as the biometric information piece in the first storage and the biometric information piece in the first storage matches the verification biometric information input by the user, wherein
  the identification information integrated management program allows the computer to serve as:
  - an obtaining unit for obtaining the identification information piece and the reference biometric information piece registered by the user in each of the service providing systems from each of the service providing systems as a registration target identification information piece and a registration target reference biometric information piece, respectively;
  - a second storage registering and storing the reference biometric information piece as a registered reference biometric information piece and the plurality of different identification information pieces as registered identification information pieces in association with each other, each of the different identification information pieces being used in each of the service providing systems;
  - a first comparing unit for comparing the registration target reference biometric information piece obtained by the obtaining unit with registered reference biometric information piece having been stored in the second storage;
  - a first judging unit for judging presence or absence of the registered reference biometric information piece conforming to the registration target reference biometric information piece based on a comparison result by the first comparing unit;
  - an updating unit for updating information in the second storage for storing the registration target identification information piece and the registration target reference biometric information piece in the second storage as the registered identification information piece and the registered reference biometric information piece, respectively, when the first judging unit judges that registered reference biometric information piece conforming to the registration target reference biometric information piece is not present;

a verification information receiving unit for receiving the verification biometric information piece input by the user and transmitted from each of the service providing systems, when the biometric information piece corresponding to the verification identification information piece is not registered in the first storage at the time of user authentication by using the verification identification information piece and the verification biometric information piece input by the user before starting to provide the predetermined service;

a confirming unit for confirming whether or not an identification information piece conforming to the verification identification information piece received by the verification information receiving unit is present in the second storage;

a second comparing unit for comparing, when presence of the identification information piece conforming to the verification identification information piece is confirmed by the confirming unit, one or more registered reference biometric information pieces associated with the identification information piece in the second storage with the verification biometric information piece received by the verification information receiving unit;

a second judging unit for judging presence or absence of a registered reference biometric information piece conforming to the verification biometric information piece, based on a comparison result by the second comparing unit;

a list creating unit for creating a candidate identification information list by extracting, when the second judging unit judges that the registered reference biometric information piece conforming to the verification biometric information piece is present, one or more registered identification information pieces associated with the registered reference biometric information piece in the second storage as one or more candidate identification information pieces to create a candidate identification information list; and a process result notifying unit for notifying the service providing system, which has transmitted the verification identification information piece and the verification biometric information piece, of the candidate identification information list created by the list creating unit as a process result.

* * * * *